United States Patent
Aronsson

(10) Patent No.: US 7,037,620 B2
(45) Date of Patent: May 2, 2006

(54) MULTI-CELLULAR ELECTRICAL BATTERY

(75) Inventor: Robert R Aronsson, Ft. Lauderdale, FL (US)

(73) Assignee: Apollo Energy Systems, Incorporated, Pompano, Beach, FL (US)

( * ) Notice: Subject to any disclaimer, the term of this patent is extended or adjusted under 35 U.S.C. 154(b) by 459 days.

(21) Appl. No.: 10/280,008

(22) Filed: Oct. 25, 2002

(65) Prior Publication Data

US 2003/0054240 A1 Mar. 20, 2003

Related U.S. Application Data

(63) Continuation of application No. PCT/US01/13440, filed on Apr. 27, 2001.

(60) Provisional application No. 60/200,503, filed on Apr. 28, 2000.

(51) Int. Cl.
H01M 2/02 (2006.01)
H01M 2/06 (2006.01)
H01M 2/12 (2006.01)
H01M 2/36 (2006.01)

(52) U.S. Cl. ............................ 429/76; 429/81; 429/82; 429/157; 429/158; 429/176; 429/181

(58) Field of Classification Search .................. 429/72, 429/73, 74, 76, 79, 80, 81, 82, 152, 157, 429/158, 159, 160, 176, 181, 225, 235, 245
See application file for complete search history.

(56) References Cited

U.S. PATENT DOCUMENTS

| | | | |
|---|---|---|---|
| 1,499,704 A | 7/1924 | Stebbins | |
| 2,143,340 A * | 1/1939 | Willits | 429/82 |
| 2,346,313 A | 4/1944 | Keller | |
| 2,355,288 A * | 8/1944 | Fritzinger | 429/85 |
| 2,375,406 A * | 5/1945 | Drown | 429/76 |
| 2,472,852 A | 6/1949 | Lighton | |
| 3,372,716 A * | 3/1968 | Hommel et al. | 429/74 X |
| 3,518,127 A | 6/1970 | Aronson | |
| 3,767,468 A | 10/1973 | Schusler | |
| 3,933,522 A | 1/1976 | Steig | |
| 4,592,972 A | 6/1986 | Juergens et al. | 429/160 |
| 4,618,544 A | 10/1986 | Brooks | 429/53 |
| 4,945,011 A * | 7/1990 | Tanaka | 429/81 |
| 5,104,752 A | 4/1992 | Baughman et al. | 429/1 |
| 5,378,552 A | 1/1995 | Dixon, Jr. | 429/91 |
| 6,500,585 B1 * | 12/2002 | Saakes et al. | 429/232 |

FOREIGN PATENT DOCUMENTS

| | | | |
|---|---|---|---|
| EP | 41334 | * | 12/1981 |
| JP | 60-39763 | * | 3/1985 |

* cited by examiner

*Primary Examiner*—Stephen J. Kalafut
(74) *Attorney, Agent, or Firm*—Pillsbury Winthrop Shaw Pittman LLP

(57) ABSTRACT

An electrical battery for multi-cellular interconnection in series, parallel or series and parallel has a protrusion and a recess, such as a tongue and a groove, extending on outer surfaces of the sidewalls of the battery case such that when a protrusion of one battery is slid into a recess of another, the two batteries are electrically connected by the portions of the protrusion and the recess that are made of electrically conductive materials connected to the voltage producing elements inside the case. The battery further includes hollow plug-in posts and plug-in pins at the top and the bottom of the case that are connected to the voltage producing elements of the battery so that when the plug-in pins of one battery are inserted into the plug-in posts of another, the two batteries are in electrical interconnection. The battery also includes an electrolyte recirculation, gas purging, and automatic watering systems.

100 Claims, 13 Drawing Sheets

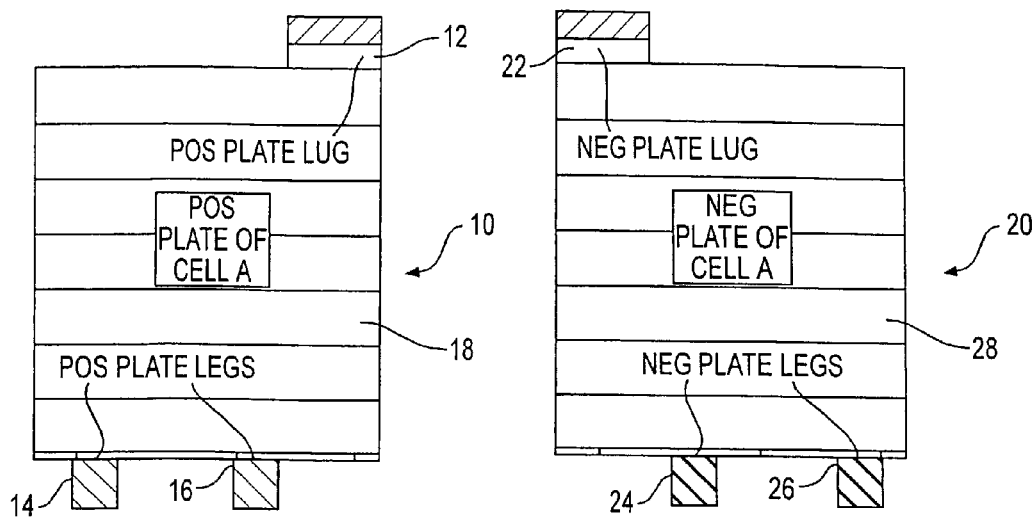
FIG. 1A
PRIOR ART
FIG. 1B
PRIOR ART
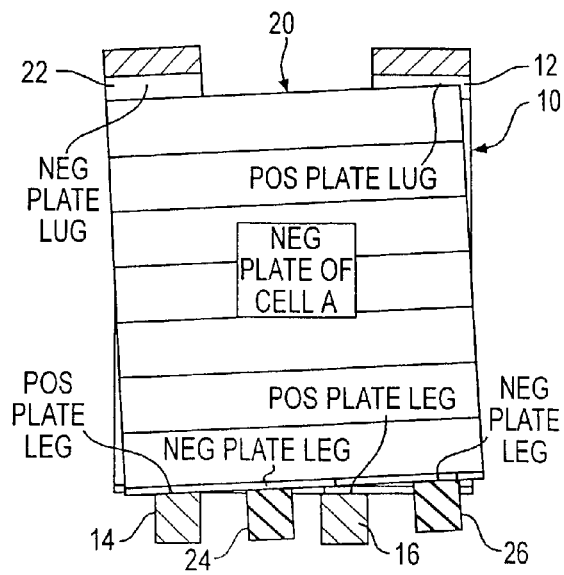
FIG. 2
PRIOR ART

CELL 3 IS EASILY REMOVED

MULTI-CELLULAR ELECTRICAL BATTERY

This application is a continuation of international application No. PCT/US01/13440 filed Apr. 27, 2001, and claims the benefit of U.S. Provisional Patent Application No. 60/200,503, which was filed on Apr. 28, 2000, the disclosure of each being incorporated herein by this reference and their priority claimed.

BACKGROUND OF THE INVENTION

1. Field of the Invention

This invention relates to an electrical battery that comprises a plurality of current generating battery cells, examples of which include electrolyte lead-acid batteries, primary batteries, secondary batteries, and fuel cells.

2. Description of Related Art

Electrical batteries are used in just about every facet of modern life. The diverse applications of electrical batteries include starting a vehicle, boat or airplane engine; providing emergency lighting; supplying electric power to a vehicle motor; and serving as energy buffer storage for solar-electric energy. Reasons for the widespread use of the electrical batteries are not difficult to identify. For one, such batteries as storage batteries enjoy an excellent reputation for their reliability, sturdiness, portability, and inexpensiveness as sources for direct current voltage. In other instances, such batteries as fuel cells offer viable alternatives to gasoline in midst of growing concerns regarding the global warming and the degradation of the environment.

Electrical batteries in many of these wide-ranging applications typically comprise a plurality of current generating cells contained in a battery case. In turn, each of the current generating cells comprises a plurality of voltage producing elements. Examples of voltage producing elements are positive and negative plates immersed in an electrolytic solution. An electrolyte battery containing these elements generates voltage during its discharge process.

While these multi-cellular batteries have enjoyed immense popularity, the inventor of the present invention has identified several areas of potential improvement to the conventional multi-cellular electrical batteries. One such area of improvement relates to the interconnection of the battery cells that requires certain connecting components, such as top posts or side terminals with corresponding cables or connectors.

Definitionally, multi-cellular batteries are characterized in that each of the battery cells is electrically connected to another battery cell. The intercellular connection may be in series, in parallel, or both in series and parallel. A serial intercellular connection electrically connects one cell of the battery to another cell so that the voltage across all the interconnected cells is the arithmetical sum of the individual cell voltages. A parallel intercellular connection electrically connects one cell of the battery to another cell so that the voltage across the connected cells is substantially the same as the voltage across any one particular cell connected in parallel. Examples of conventional serial interconnections of cells are disclosed in U.S. Pat. No. 3,518,127 to Aronson (hereinafter "the '127 patent"), the disclosure of which is incorporated herein by reference. Examples of conventional multi-cellular connections in parallel are disclosed in U.S. Pat. No. 3,933,522 to Steig (hereinafter "the '522 patent").

Briefly, the '127 patent shows a conventional lead-acid electrolyte battery with multiple intercellular connections in series. The '127 patent discloses several arrangements for serial interconnection of cells. In one arrangement, attaching bars disposed along the battery floor serially connect an electrolytic cell to adjacent cells. Each of the attaching bars is connected to the plates of one polarity in one cell and the plates of the opposite polarity in the adjacent cell. In another arrangement disclosed in the '127 patent, a metal strap that straddles over a partition wall between two cells serially connects the two adjacent cells. In this arrangement, plates of the same polarity within each cell are connected to a bus bar, and the connecting strap is fixed rigidly to the two bus bars of different polarities in the cells being connected.

The '522 patent shows a conventional storage battery with vertically stacked battery cells that are designed to increase the capacity of the battery. The '522 patent discloses several embodiments that electrically connect the stacked cells. In one arrangement, the upper and lower cells are connected in parallel by laterally extending conductors and vertically extending connectors. Each of the laterally extending conductors is connected to the plates of one polarity and laterally extends to the outside of the cell housing. The vertically extending connectors connect the laterally extending connectors of the upper and lower cells having the same polarity.

As is evident from the above descriptions of the '127 patent and the '522 patent, the conventional intercellular connections—whether in series or in parallel—require rigidly fixed connections utilizing various connecting components. The serial interconnection shown in the '127 patent uses attaching bars along the battery floor or metal straps over the partitions between the cells. The parallel interconnection shown in the '522 patent uses the vertically extending cell connectors outside the cell housing.

There are several drawbacks to the external connectors, for example, straps 96 in the '127 patent. One, such connection arrangements require additional parts, which increases the manufacturing costs of the batteries. Two, various connectors add to the overall weight of the battery and occupy spaces that otherwise would be useful for other purposes. Three, the rigidly fixed attachments between the connectors and the cells inhibit easy insertion and removal of individual cells in the event it is necessary to replace or repair a particular cell.

Another shortcoming of the conventional multi-cellular batteries relates more specifically to electrolyte batteries. In particular, the battery according to an aspect of the present invention addresses the general need for an electrolyte recirculation and gas purging system in electrolyte batteries. That electrolyte batteries require an electrolyte recirculation and gas purging system is well known in the art: The electrochemical reactions during the charge and discharge operations of the electrolyte batteries create several complications, including the problems of the polarization concentration at the electrode surfaces, electrolyte stratification, gas bubble formation on the electrodes, and a build up of electrolyte impurities. If not addressed, these problems would significantly undermine the performance and/or safety of the battery.

SUMMARY OF THE INVENTION

Therefore, an object of the present invention is to provide an electrical battery addressing the above-noted shortcomings of the conventional battery and having a plurality of current generating cells wherein the electrical intercellular connections do not require external connectors, such as top posts or side terminals and corresponding cables or connectors.

It is a further object of the present invention to provide current generating battery cells whose serial, parallel, or serial and parallel interconnections are such that individual cells or a group of cells are easy to insert and remove from a string of multiple cells.

Yet another object of the present invention is to provide a novel electrolyte recirculation and gas purging system that addresses the problems of the polarization concentration at the electrode surfaces, electrolyte stratification, and gas bubble formation on the electrodes.

Accordingly, a first aspect of the present invention is that a plurality of electrical battery cells are connected in series by connecting cells horizontally using a tongue and groove arrangement that is provided on sidewalls of a battery case that contains therein voltage producing elements such as the positive and negative plate elements immersed in an electrolyte solution. The cross-sections of the tongue and groove according to the present invention have corresponding cross-sections so that when the tongue of a cell slides into the groove of another cell, the two cells are mechanically connected under pressure. The tongue is a protrusion extending on an outer surface of a sidewall of the battery base and preferably has a trapezoidal cross-section. The groove is a recess extending on an outer surface of another sidewall of the battery case and preferably has a corresponding trapezoidal cross-section constructed and arranged to receive the tongue in a tight-fitting fashion. Thus, the cells held in mechanical connection by the tongue and groove configuration are connected electrically by the interconnection of bus bar lateral extensions of the cells, as a portion of each of the protrusion (or the tongue) and the recess are made of electrically conductive materials. For example, each of the bus bar lateral extensions is made of electrically conductive materials and is connected to the bus bar of its respective cell. The bus bar lateral extensions extend from the bus bars toward and through the sidewalls of the cells. When the tongue of one cell is slid fully into the groove of another cell, the bus bar lateral extension of one cell contacts the bus bar lateral extension of the other cell. Because the bus bar lateral extensions are made of electrically conductive materials and are connected to the bus bars of their respective cells, the two cells are in electrical connection. Further, since the bus bar lateral extensions in contact with one another at the interconnection are arranged to connect to the bus bar of the opposite polarity, the interconnected cells are connected in series.

In an alternative embodiment, a plurality of tongues and grooves are provided on the sidewalls. In another alternative embodiment, the bus bar lateral extensions extend only to the inner surfaces of the cell casing, and electrically conductive lead bushings are provided in the sidewalls. Each of the bus bar lateral extensions contacts one end of the electrically conductive lead bushing, and the other end of the electrically conductive lead bushing is exposed to the exterior of the cell casing. Therefore, in such alternative embodiment, a plurality of cells are interconnected electrically via the lead bushings of the cells which are connected to the respective bus bar extensions of the cells, which in turn is connected to the bus bars of the cells.

A second aspect of the present invention is that a plurality of electrical battery cells are connected in parallel by connecting cells vertically using hollow plug-in posts and solid plug-in pins, which are provided, respectively, at the top and the bottom of the cell. The hollow plug-in posts and plug-in pins are made of electrically conductive materials and are connected, respectively, to the top plate bus bars and the bottom bus bars of the battery cell. The plug-in posts and the plug-in pins are constructed and arranged so that when two cells are stacked vertically on top of another, the plug-in pins of the first cell are inserted fittingly into the hollow plug-in posts of the second cell. When the plug-in pins of the first cell are inserted into the hollow plug-in posts of the second cell, the bottom surface of the first cell rests flush with the top surface of the second cell. The two cells are connected mechanically at the pin-to-post junction by the weight of the upper cell. The two cells are connected electrically by the electrically conductive plug-in posts and plug-in pins that are connected to the voltage producing elements of the respective cells via the bus bars. Furthermore, the vertically stacked cells are connected in parallel by matching the plug-in pin that is connected to the bus bar of one polarity in the first cell to the plug-in post that is connected to the bus bar of the same polarity in the second cell.

A third aspect of the present invention is that multiple battery cells are connected both in series and parallel without using rigidly fixed connectors. According to this aspect of the invention, the two rows of cells horizontally connected in series in accordance with the first aspect of the invention, are stacked vertically in accordance with the second aspect of the present invention. In this arrangement, the cells connected horizontally are connected electrically in series by the protrusion or the tongue extending on an outer surface of a sidewall of one cell casing and the recess or the groove extending on an outer surface of a sidewall of another cell casing. The cells connected vertically are connected electrically in parallel by the plug-in posts and plug-in pins.

A fourth aspect of the present invention provides a novel electrolyte recirculation and gas purging system. In the top section of the cell, an air inlet is formed near the upper wall of the battery case through a sidewall, and an air outlet is provided through the opposite sidewall near the upper wall. The air inlet is connected to a valve which extends horizontally from the air inlet to the inside of the cell so that it hangs over the electrolyte solution. A felt baffle is provided opposite the distal end of the venturi valve. Between the distal end of the venturi valve and the air inlet, the venturi valve is connected to an electrolyte suction tube, which extends vertically downward to near the bottom surface of the cell.

When compressed air is continuously supplied to the venturi valve through the air inlet, the compressed air creates pressure that suctions the electrolyte upward from the bottom of the cell through the electrolyte suction tube into the venturi valve. The suctioned electrolyte and air then exit the venturi valve through the distal end of the venturi valve and are sprayed out into the cell above the electrolyte. The air and the electrolyte are then separated by the felt baffle, which deflects the air and the electrolyte spray downward. Most of the electrolyte is absorbed by the felt baffle while the air exits the housing through the air outlet. When the felt baffle becomes super-saturated with electrolyte, additional electrolyte spray is deflected by the baffle downward to the main body of the electrolyte in the cell.

Thus, the electrolyte is recirculated continuously as the electrolyte at the bottom of the cell is suctioned upward through the electrolyte suction tube and is sprayed over the electrolyte. At the same time, the electrolyte at the top of the cell moves toward the bottom. By this movement of the electrolyte, polarization concentration at the electrode surfaces during the discharge is lessened or eliminated. Further, the hydrogen and oxygen gases from the electrochemical reaction that rise to the top of the cell are purged on a continuous basis.

In accordance with a fifth aspect of the present invention, the battery case is provided with an automatic watering system in which ball floats and sealing balls, which could be an integrally formed, are provided in open mesh tubes positioned in such a way to allow closure of the air inlet or the air outlet if the battery case is tipped at a sharp angle. Further, a floating ball floating on the surface of the electrolyte is provided opposite the water tube through which the replenishing water is supplying the electrolyte solution. The floating ball floats on the surface of the electrolyte thus when the electrolyte reaches its maximum level, it seals off the water tube.

Other objects, features, and characteristics of the present invention will become apparent upon consideration of the following description and the claims to be appended later with reference to the accompanying drawings, all of which form a part of the specification, wherein like reference numerals designate corresponding parts in the various figures.

BRIEF DESCRIPTION OF THE DRAWINGS

FIGS. 1A and 1B are side elevations of an exemplary, conventional positive plate and negative plate disposed inside the electrical battery cells according to the present invention;

FIG. 2 is a side elevation of the conventional positive plate and negative plate shown in FIG. 1 paired together with the negative plate slightly askew to show partially the positive plate behind it;

DETAILED DESCRIPTION OF EXEMPLARY EMBODIMENTS

Figure 3A:
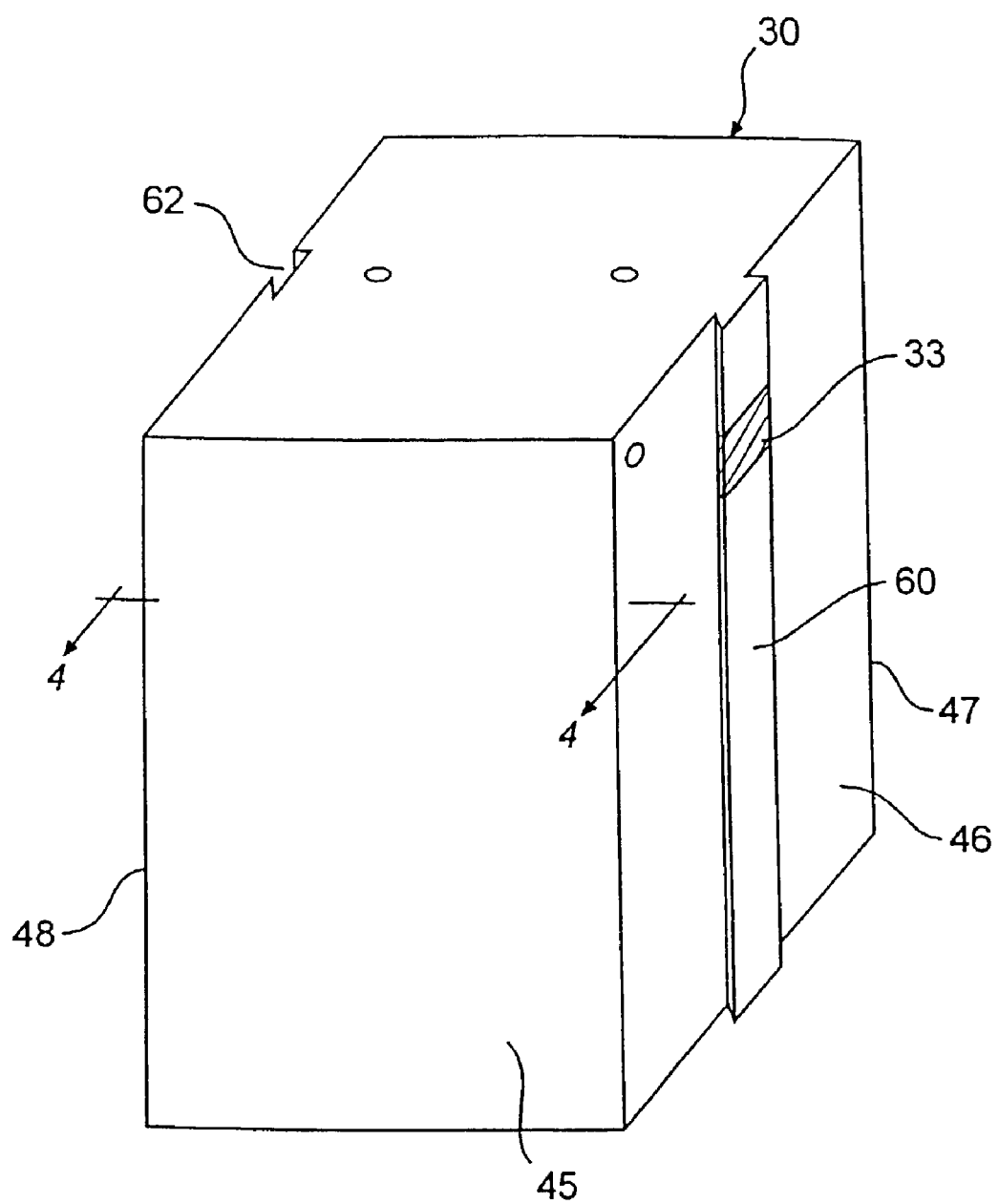
FIG. 3A is a three dimensional view of an electrolytic cell according to the present invention.

A lead acid storage battery most suitably exemplifies the principles of the present invention. It should be noted, however, that the inventive aspects of the present invention may apply to any multi-cellular electrical battery including secondary batteries, primary batteries and fuel cells.

Typically, a lead acid battery is composed of a number of distinct electrolytic cells, each of which is composed of an equal number of paired positive and negative battery plates immersed in an electrolyte solution. In the most common arrangement, positive plates of lead peroxide and negative plates of spongy lead are immersed in an electrolyte solution of sulfuric acid. Preferably, the battery according to the present invention has electrodes with a plate substrate (sometimes also called a grid or expanded metal mesh) that is a solid or porous sheet of a material consisting of lead, alloyed with small amounts of calcium, tin and silver. The plate substrate material may be mixed with a conductive polymer substance, carbon fibers or a combination of both, or the substrate may be lead foam with no conductive polymer or carbon fiber.

Rather than the discrete plates of positive and negative electrodes, a battery according to the present invention may use bipolar plates having a cathodic material on one side and an anodic material on the other side of each plate. These bipolar batteries have garnered much attention for their decreased size and weight; however, the basic mechanics of their charge and discharge processes remain essentially the same as the lead acid batteries having discrete positive and negative plates. Thus, although the present invention is described primarily as having two discrete electrode plates, it can be easily modified to include batteries using bipolar plates.

During the discharging operation, the lead acid battery supplies direct current to a load. The positive and negative plates react with the sulfuric acid forming lead sulfate and water. The water is formed at the positive plate and dilutes the sulfuric acid. Electrons from the negative plate then migrate to the positive plate, and a direct current voltage appears across each pair of plates. Each of these pairs of plates is connected in parallel with adjacent pairs of plates so that the voltage across the cell is substantially the same as the voltage across any pair of plates within that cell. The cells in the battery typically are connected serially with adjoining cells so that the voltage across the entire battery is the arithmetic sum of the voltage across each of the cells.

In the charging operation, during which the batteries are supplied with direct current, the plates are chemically reconverted to their original material, and the water in the electrolyte solution chemically combines with the electrolyte and plate material. Thus, the battery can be cycled alternately through a large number of charging and recharging operations, alternately storing and producing energy, being available as a self-contained power source between recharging operations.

FIGS. 1A and 1B show exemplary positive plates and negative plates. Each of the positive plates 10 and negative plates 20 has a top extension and two bottom extensions extending from a rectangular main body portion of the plate. The top extensions are referred to as lugs 12, 22, and the two bottom extensions are referred to as legs 14, 16, 24, 26. Thus, as illustrated in FIG. 1A, the positive plate 10 has one positive plate lug 12, extending vertically upward from the upper edge of the main body portion 18 of the positive plate, and two positive legs 14, 16, each extending vertically downward from the bottom edge of the main body portion 18. Likewise, as illustrated in FIG. 1B, the negative plate 20 has one negative plate lug 22, extending vertically upward from the main body portion 28 of the negative plate, and two negative legs 24, 26, extending vertically downward from the main body portion 28.

FIG. 2 illustrates the positive plate 10 and the negative plate 20 paired together. While the negative plate 20 is shown tilted, that is only for purposes of viewing each plate in the figure. When installed in the battery, they would both be vertical. The respective lugs and legs of the positive and negative plates are positioned in an offset manner. As shown in FIG. 2, the positive lug 12 is flush to one side along the top edge of the paired plates, while the negative lug 22 is flush to the other side of the plate along the top edge. Similarly, the positive legs 14, 16 are positioned in an offset fashion vis-a-vis the negative legs 24, 26.

Figure 3B:
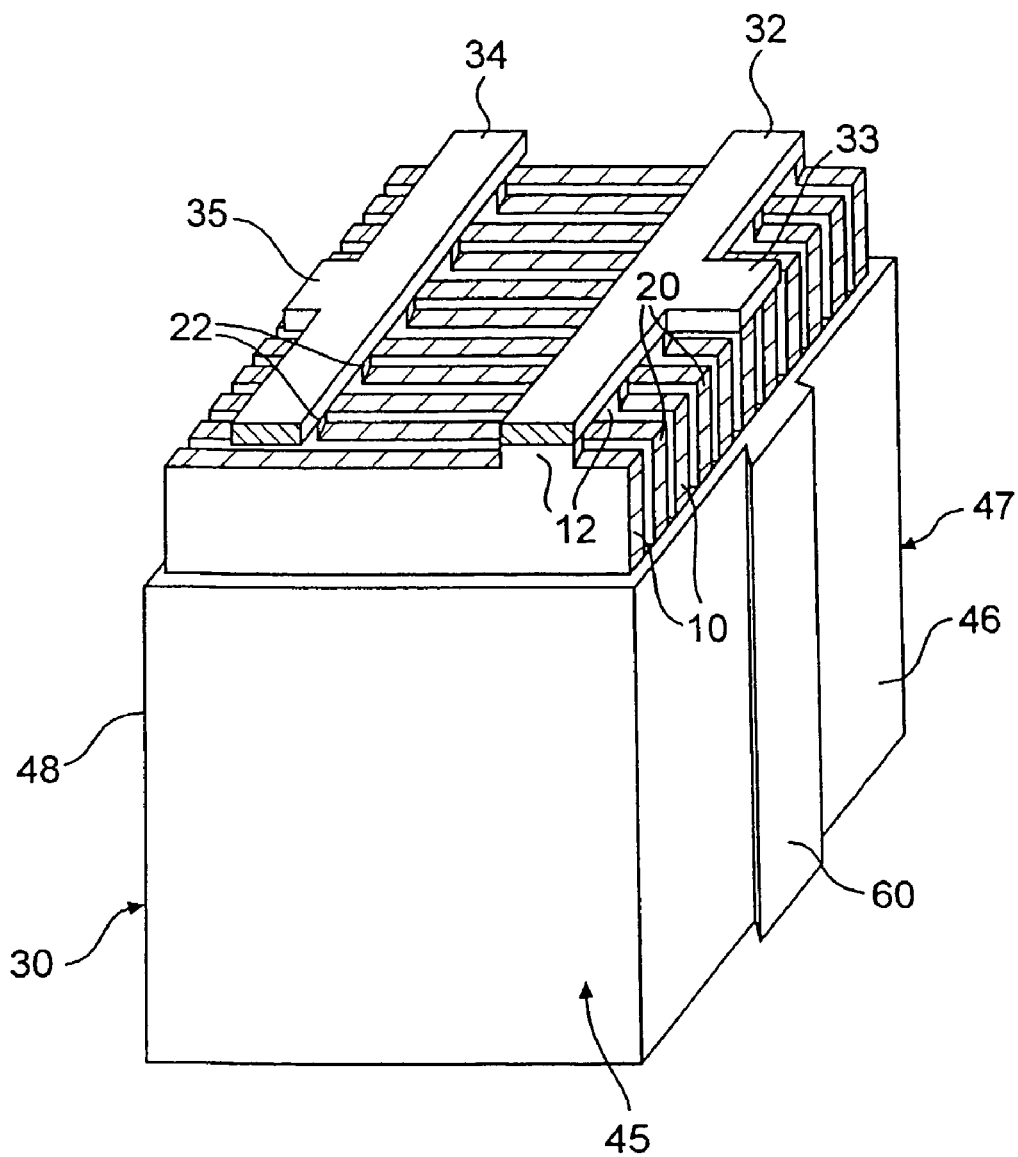
FIG. 3B is a partially sectioned three dimensional view of the electrolyte cell shown in FIG. 3A.

In a given cell, at least two such pairs of positive plates and negative plates are provided in a battery case 30, or also referred to herein as a cell casing, which is shown in FIGS. 3A and 3B. In each cell casing 30, the positive plates 10 and negative plates 20 are arranged alternately. As shown in FIG. 3B, because the lugs of each polarity are offset from the lugs of the other polarity, all the positive lugs 12 align together on one side of the cell, and all the negative lugs 22 align together on the other side of the cell. In FIG. 3B, the positive top plate bus bar 32 links the aligned positive lugs 12, and the negative top plate bus bar 34 links the aligned negative lugs 22.

Similarly, when the plates are arranged in the cell casing 30, the first and second legs of each polarity align themselves respectively with all other first and second legs of the same polarity (not shown). Then, all first positive legs 14 and first negative legs 26 are linked, respectively, to a positive bottom bus bar 36 and a negative bottom bus bar 38. Thus, all the positive and negative lugs are connected to their respective top plate bus bars, and all the legs are connected to their respective bottom bus bars. The overall effect of such arrangement is that, within each cell, all pairs of the plates are connected in parallel so that the voltage across the cell is substantially the same as the voltage across any pair of the plates within that cell.

The interconnections of cells are effected by connecting a bus bar of one cell to a bus bar of another cell. To interconnect two cells serially, the bus bar in one cell is connected to the bus bar having the opposite polarity in the other cell. To interconnect two cells in parallel, the bus bar in one cell is connected to the bus bar having the same polarity in the other cell.

More specifically, to interconnect cells in series, the present invention connects the cells horizontally using a tongue and a groove provided on the sidewalls 46, 48 of the cell casing 30, as shown in FIG. 3A. The cell casing 30 is made of a non-conductive material such as polypropylene and preferably has a rectangular box shape. As can be seen in FIG. 3B, the positive and negative plates 10, 20 are arranged inside the casing main 30 alternately from the front wall 45 to the back wall 47. Optionally, partitions (not shown) may be provided between pluralities of positive and negative plates 10, 20, as is disclosed in U.S. Pat. No. 5,918,661. FIG. 3B also illustrates the bus bar lateral extensions 33, 35 which are connected to the bus bars 32, 34. The bus bar lateral extensions 33, 35 extend toward the outside of the cell casing 30, and the axial end surfaces of the bus bar lateral extensions 33, 35 lie coplanar with the surfaces of sidewall 46, 48, as shown in FIG. 3A.

Figure 3C:
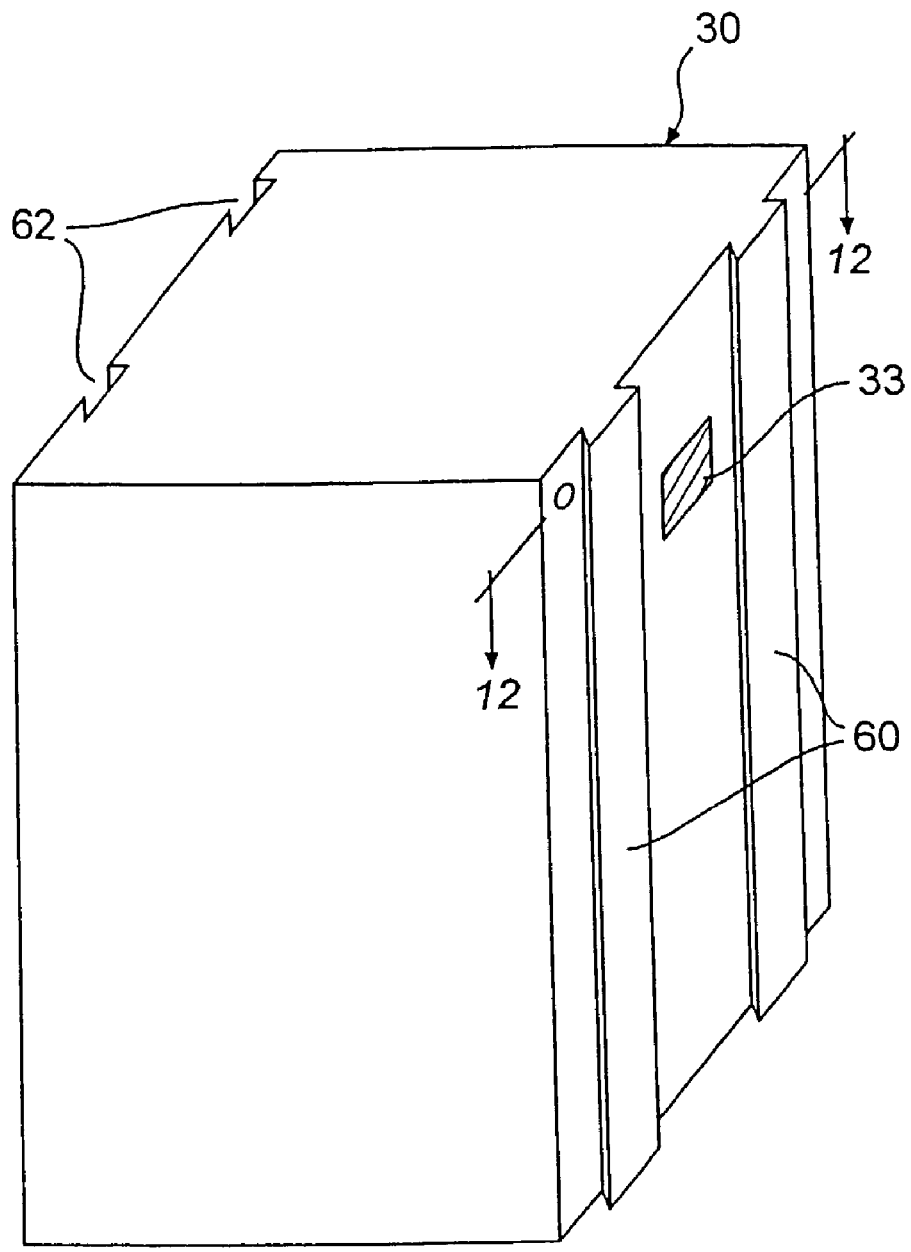
FIG. 3C is a three dimensional view of an alternative embodiment of the electrolyte cell shown in FIG. 3A.
Figure 3D:
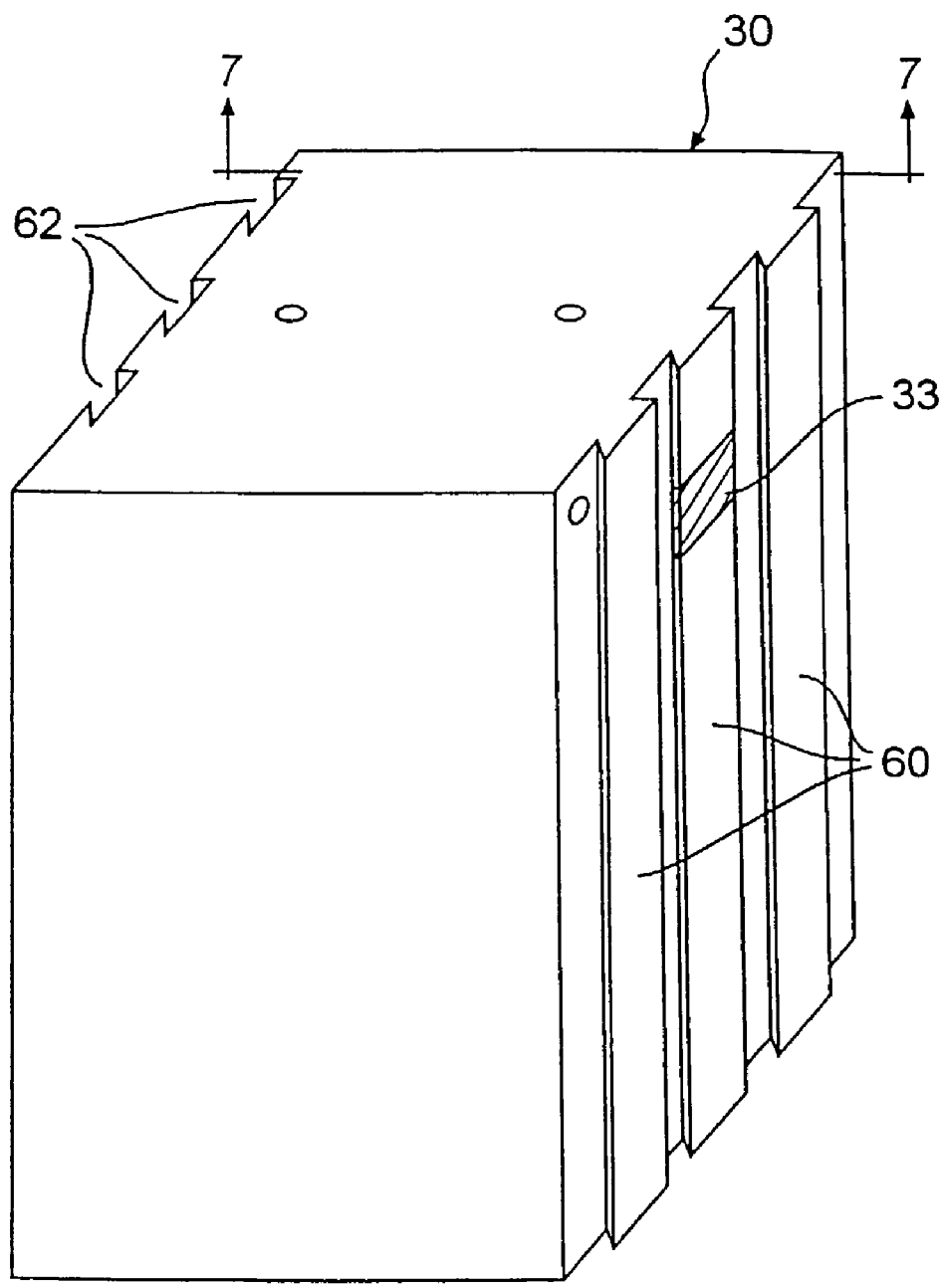
FIG. 3D is a three dimensional view of yet another embodiment of the electrolyte cell shown in FIG. 3A.

In FIG. 3A, a tongue 60, which is an example of the protrusion in accordance with the principles of the present invention, is provided on one sidewall 46, and a groove 62, which is an example of the recess in accordance with the principles of the present invention, is provided on another sidewall 48 of the cell casing 30. Preferably, the tongue 60 and the groove 62 extend substantially in the vertical direction on the sidewalls, although they may be angled slightly. Another variation within the spirit of this present invention is that there may be two or more sets of tongues and grooves as shown in FIGS. 3C and 3D. Yet another variation of the protrusion and the recess provided for the serial intercellular connection within the spirit of this present invention is that the protrusion and the recess extend only partially along the outer surface of the sidewalls.

The tongue 60 and groove 62 are selectively sized to engage one another in a tightly-fitting manner when the tongue of one cell is slid down into the groove of another cell. In the example shown in FIG. 3A, only one tongue is provided, and it has preferably a trapezoidal cross-section, extending substantially from the top to the bottom of the sidewall 46 of the cell casing 30. On the other hand, the groove 62 is a recess with a trapezoidal cross-section corresponding to the cross-section of the tongue, extending substantially along the vertical axis on the opposing sidewall. The tongue 60 and groove 62 preferably are made of the same material as the battery or cell casing, such as polypropylene, or may be molded into the battery or cell casing.

While the tongue and groove configuration mechanically connects the adjoining cells, the electrical connection of the cells in series is achieved by the bus bar lateral extensions 33, 35 of the cells that are exposed to the exterior of the cell casing 30. As discussed previously and shown in FIG. 3B, the top plate bus bars 32, 34 are connected to the lugs 12, 22 of respective plates 10, 20. The bus bars 32, 34 are made of electrically conductive materials, such as lead or a highly conductive lead-alloy. As shown in FIG. 3B, the bus bars 32, 34 extend from the front wall 45 of the cell casing 30 to the back wall 47 of the cell casing 30, and the bus bar lateral extensions 33, 35 extend from the bus bars 32, 34 towards and through the sidewalls 46, 48 of the cell casing 30 so that the axial ends of the bus bar extensions 33, 35 are exposed to the exterior of the cell casing 30. The bus bar lateral extensions are made of electrically conductive materials, such as lead or a highly conductive lead-alloy. As shown in FIG. 3A, the surface of the exposed axial ends of the bus bar lateral extensions 33, 35 are coplanar with the outer surfaces of the sidewalls 46, 48.

Figure 4:
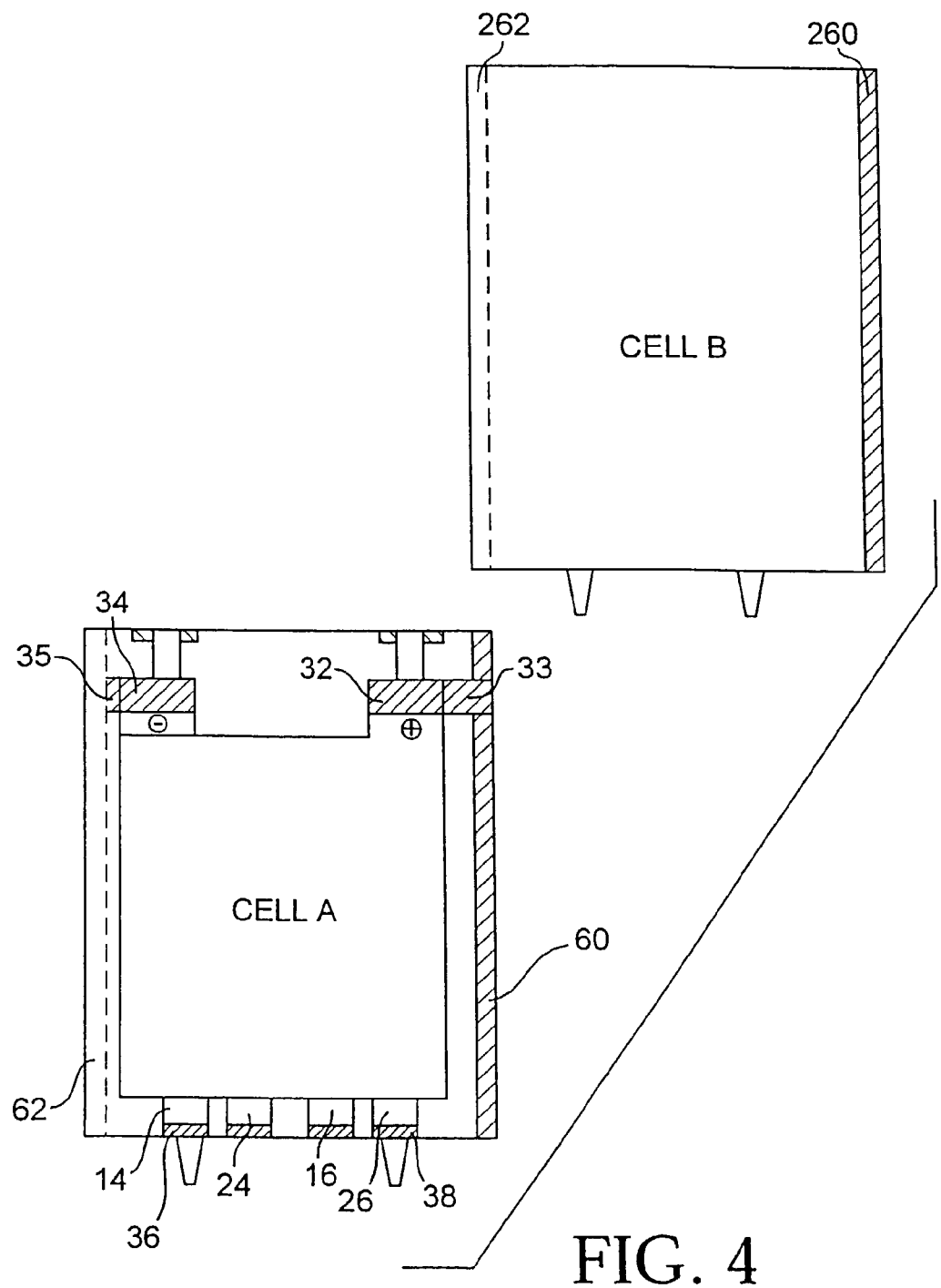
FIG. 4 is a side elevation of two electrolytic cells in accordance with the present invention before their electrical connection in series, wherein one of the exemplary cells is shown in a sectional view taken along line 4—4 of FIG. 3A.
Figure 5A:
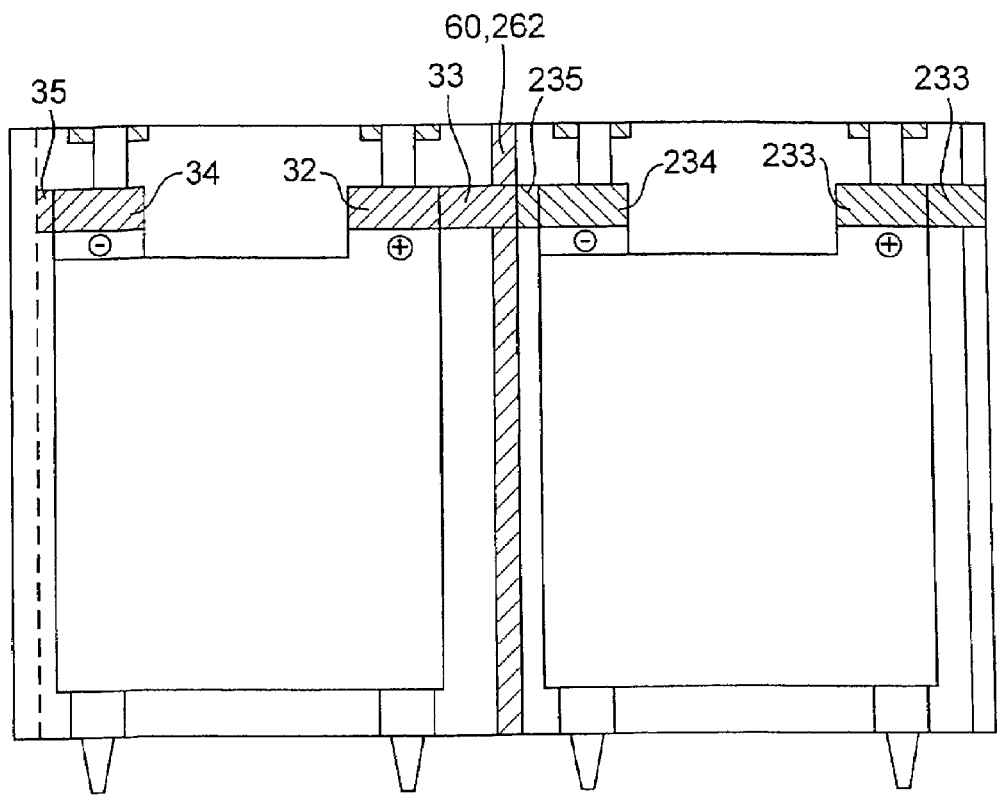
FIG. 5A is a sectioned side elevation of the two electrolytic cells illustrated in FIG. 4 in electrical connection in series and illustrates the tongue and groove arrangement as an example of the protrusion and recess configuration in accordance with the principles of the present invention.

Thus, to connect Cell A and Cell B shown in FIG. 4, the tongue 60 of Cell A slides into the groove 62 of Cell B as illustrated in FIG. 5A. When the tongue 60 of Cell A is slid fully into the groove 62 of Cell B, the positive bus bar lateral extension 33 of Cell A comes into contact with the negative bus bar lateral extension 235 of Cell B. Therefore, since the bus bars 32, 234 and the bus bar lateral extensions 33, 235 of Cells A and Cells B are made of electrically conductive materials and the positive bus bar 32 of Cell A is connected with the negative bus bars 234 of Cell B via the bus bar lateral extensions 33, 235, Cell A and Cell B are connected electrically with one another.

To summarize, Cell A and Cell B are joined horizontally by sliding Cell B downwardly so that its groove 262 receives the tongue 60 of Cell A, until the cells come to rest in their positions shown in FIG. 5A. At that time, Cell A and Cell B are connected electrically in series because the positive top plate bus bar 32 of Cell A is connected to the negative top plate bus bar 234 of Cell B via the bus bar lateral extensions 33, 235. This electrical connection, under pressure, eliminates various forms of external intercellular connectors, such as cables and buss bars.

Figure 5B:
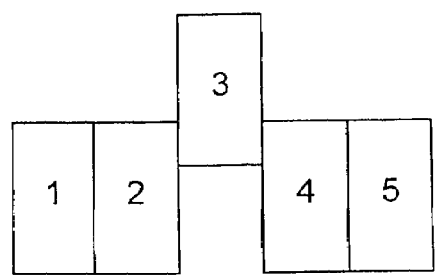
FIG. 5B is a side elevation of five cells in electrical connection in series in accordance with the principles of the present invention and illustrates the easy insertion and removal of one cell from a series of cells connected together.

One of the advantages of the interconnection of cells according to the present invention is that a cell can be easily inserted and removed from a plurality of cells connected in series. This advantage is illustrated in FIG. 5B, wherein five cells numbered 1 through 5 are interconnected using the tongue and groove arrangement. As shown in FIG. 5B, any one of the cells can be easily removed from the cells connected in series for maintenance, repair or replacement purposes.

Figure 6:
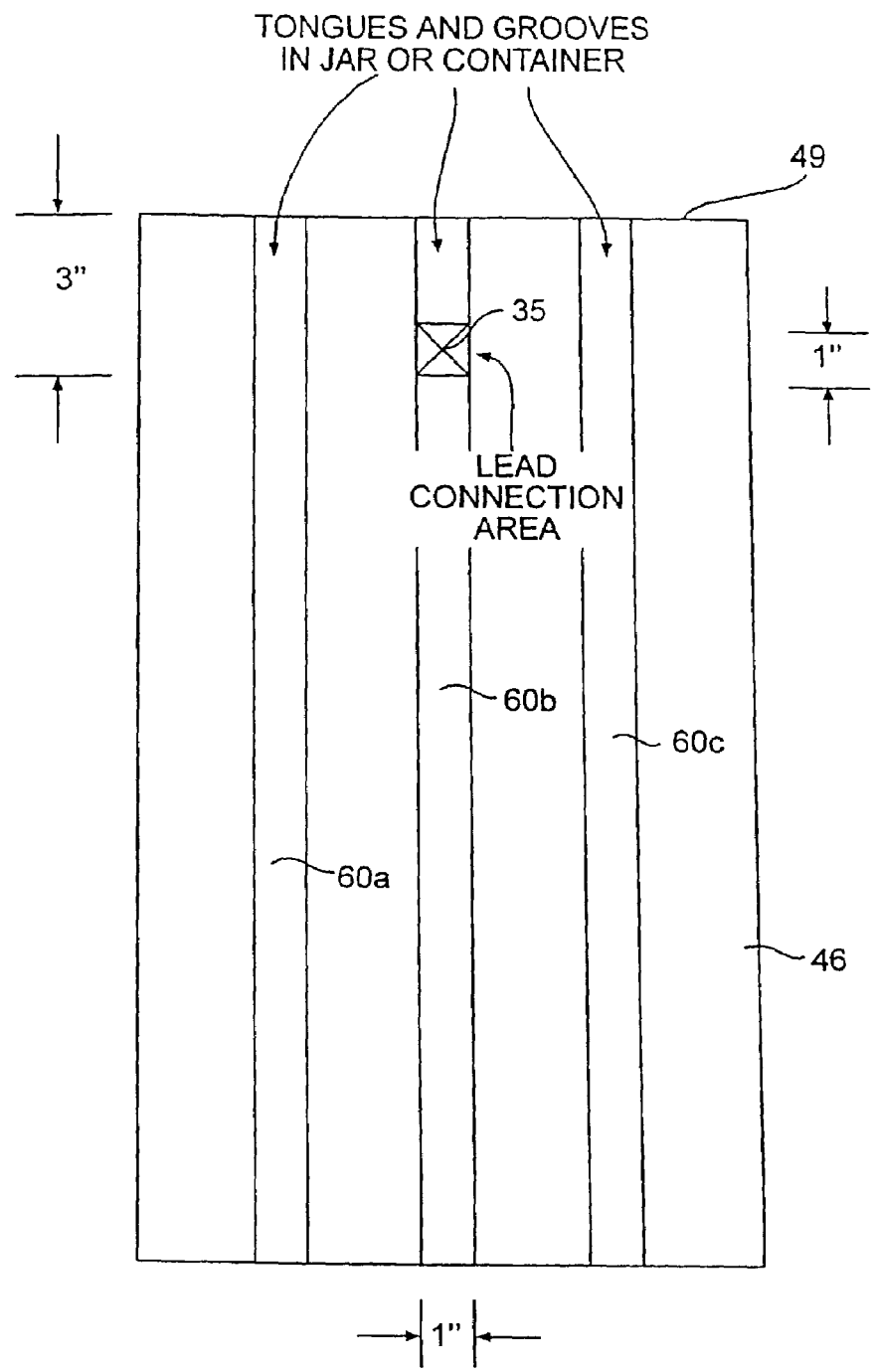
FIG. 6 is a side elevation of the electrolyte cell shown in FIG. 3D showing the lead connection area formed by the exposed axial end of the bus bar lateral extension in accordance with the present invention.

FIG. 6 shows a side view of the electrolyte cell shown in FIG. 3D. In the cell shown in FIG. 6, the bus bar lateral extension 35 extends through the sidewall 46 of the cell casing 30 and through the middle tongue 60b of the three tongues 60a, 60b, 60c provided on the sidewall 46. As shown in FIG. 6, the surface of the axial end of the bus bar lateral extension 35 is preferably a one-inch square (for small capacity cells up to 300 ampere-hours at the one-hour discharge rate) and is provided preferably two inches below the top surface 49 of the cell casing 60.

Figure 7A:
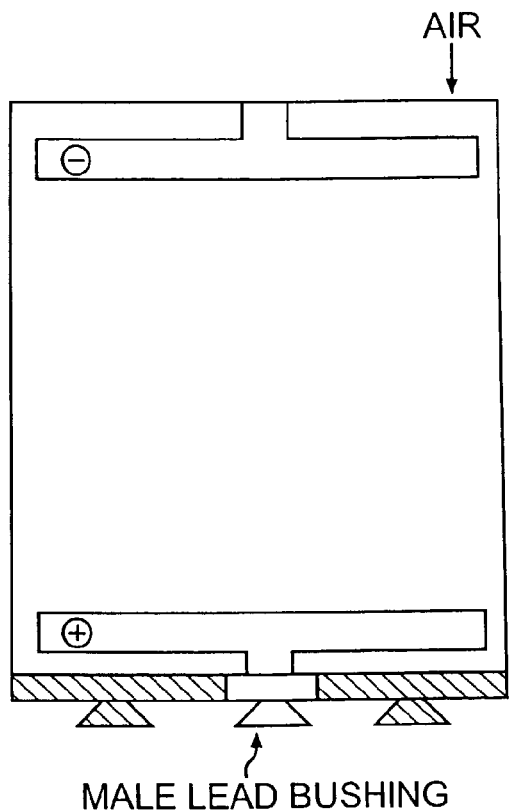
FIGS. 7A and 7B are sectional views of two electrolyte cells shown in FIG. 3D, wherein the sectional views are taken along line 7—7 of FIG. 3D to illustrate three sets of tongues and grooves in accordance with the present invention.
Figure 7B:
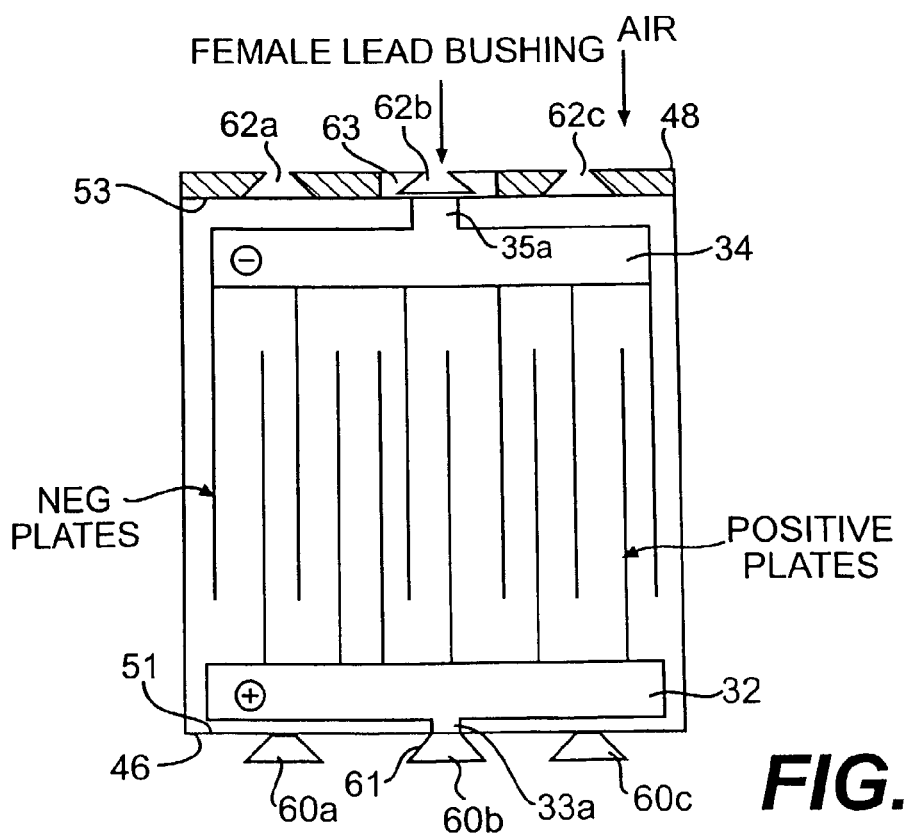

FIGS. 7A and 7B show sectioned top views of an alternative embodiment of the cell shown in FIG. 3D. Specifically, the cell shown in FIG. 7B has three sets of tongues and grooves on the sidewalls 46, 48 of the cell casing 30. However, unlike the cells described earlier wherein the bus bar lateral extensions 33, 35 extend through the sidewalls so that the axial ends of the bus bar lateral extensions 33, 35 are exposed to the exterior of the cell casing 30, the bus bar lateral extensions 33a, 35a in the cell depicted in FIG. 7B do not extend through the sidewalls 46, 48 of the cell casing 30. The bus bar lateral extensions 33a, 35a in FIG. 7B extend from the bus bars 32, 34 only to the inner surfaces 51, 53 of the sidewalls 46, 48 of the cell casing 30. As shown in FIG. 7B, at the inner surfaces 51, 53 of the sidewalls 46, 48, the bus bar lateral extensions are connected to a male lead bushing 61 and a female lead bushing 63 provided in the sidewalls 46, 48. Although, preferably, the bushings, 61, 63 are made of lead, they may be made of other electrically conductive materials, such as a highly conductive lead alloy. The electrically conductive male lead bushing 61 connects the bus bar lateral extension 33a (which in turn is connected to the positive bus bar 32) to the electrically conductive portion of the middle tongue 60b which is silver-plated. The electrically conductive female lead bushing 63 is connected to the bus bar lateral extension 35a (which in turn is connected to the negative bus bar 34). The female lead bushing 63 actually forms a part of the middle groove 62b in the sidewall 48.

Figure 8:
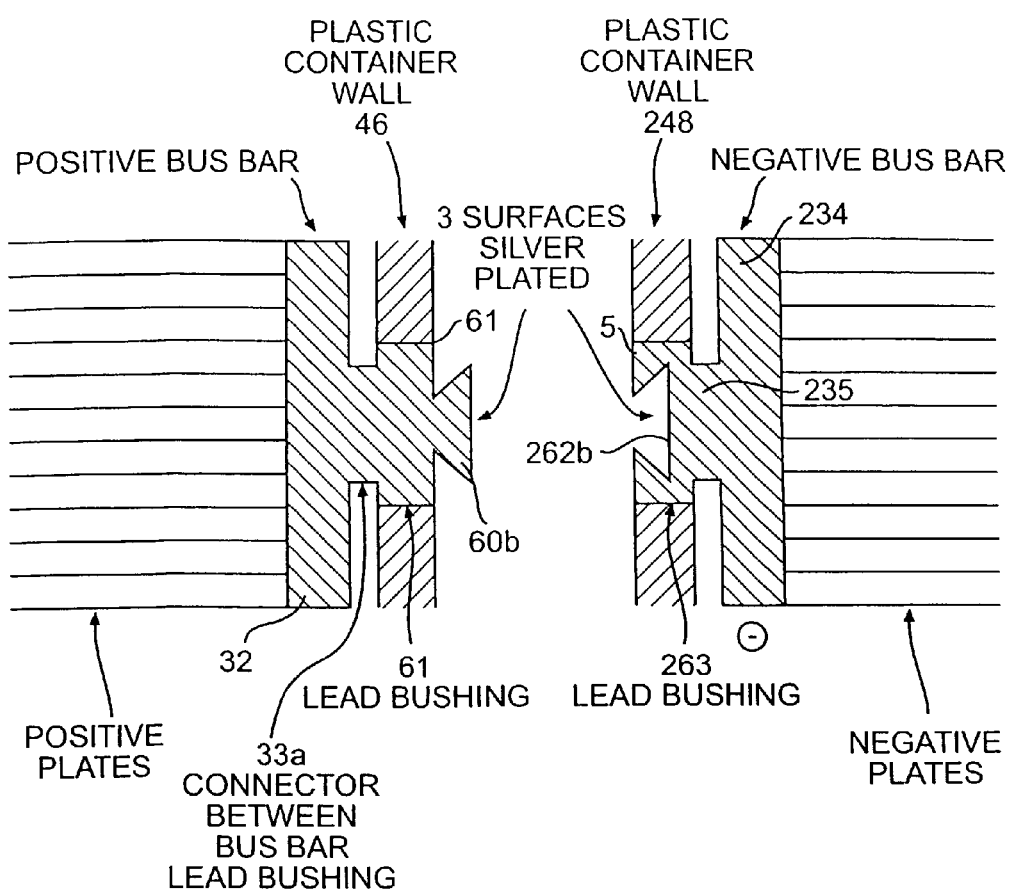
FIG. 8 is an exploded view of a portion of the middle tongue and groove shown in FIG. 7B.

The male and female lead bushings 61, 63 shown in FIGS. 7A and 7B are illustrated in greater detail in FIG. 8. In FIG. 8, the first cell illustrated on the left has reference numerals as designated in FIG. 7B, and the second cell illustrated on the right has its components with reference numerals starting with 200. As shown in FIG. 8, the bus bar lateral extension 33a contacts the male lead bushing 61 provided in the sidewall 46 of the plastic cell casing 30. The male lead bushing 61 is attached to the electrically conductive portion of the tongue 60b that is silver-plated. The other side of the bus bar lateral extension 33a is attached to the positive bus bar 32, which, as previously discussed, is connected to the aligned positive lugs 12 of the positive plates 10. Thus, in FIG. 8, the positive bus bar 32 is in electrical connection with the portion of the tongue 60b that is electrically conductive via the bus bar lateral extension 33a and the male lead bushing 61.

Likewise, the negative bus bar 234 shown in FIG. 8 is connected electrically to the electrically conductive portion 262b of the groove 262b provided on the sidewall 248 via the bus bar lateral extension 235 and the female lead bushing 263. The lead bushing 263 is made of electrically conductive material such as lead or a highly conductive lead alloy, and forms a part of the electrically conductive portion of the groove 262b, which is silver plated. As shown in FIG. 8, the female lead bushing 263 is exposed to the exterior of the cell casing 30 and is configured to receive the silver-plated portion of the tongue 60b of the first cell in a tight-fitting fashion. The lead bushing 263 is positioned so as to contact the bus bar lateral extension 235, which is in turn attached to the negative bus bar 234.

Thus, when the tongues 60a, 60b, 60c of the first cell slide down into the grooves 262a, 262b, 262c of the second cell, the electrically conductive portion of the tongue 60b of the first cell is connected electrically to the electrically conductive portion of the groove 262b of the second cell, which is formed by the female lead bushing 263. Since the silver-plated tongue 60b of the first cell and the silver plated electrically conductive portion of the groove 262b of the second cell are in electrical connection, the first and second cells are in electrical connection with one another. Further, by connecting different polarities of the two cells, the two cells are in serial connection with one another.

It should be noted that the bus bar, the bus bar lateral extensions, and the male and female lead bushings may be formed integrally or discretely.

Figure 9:
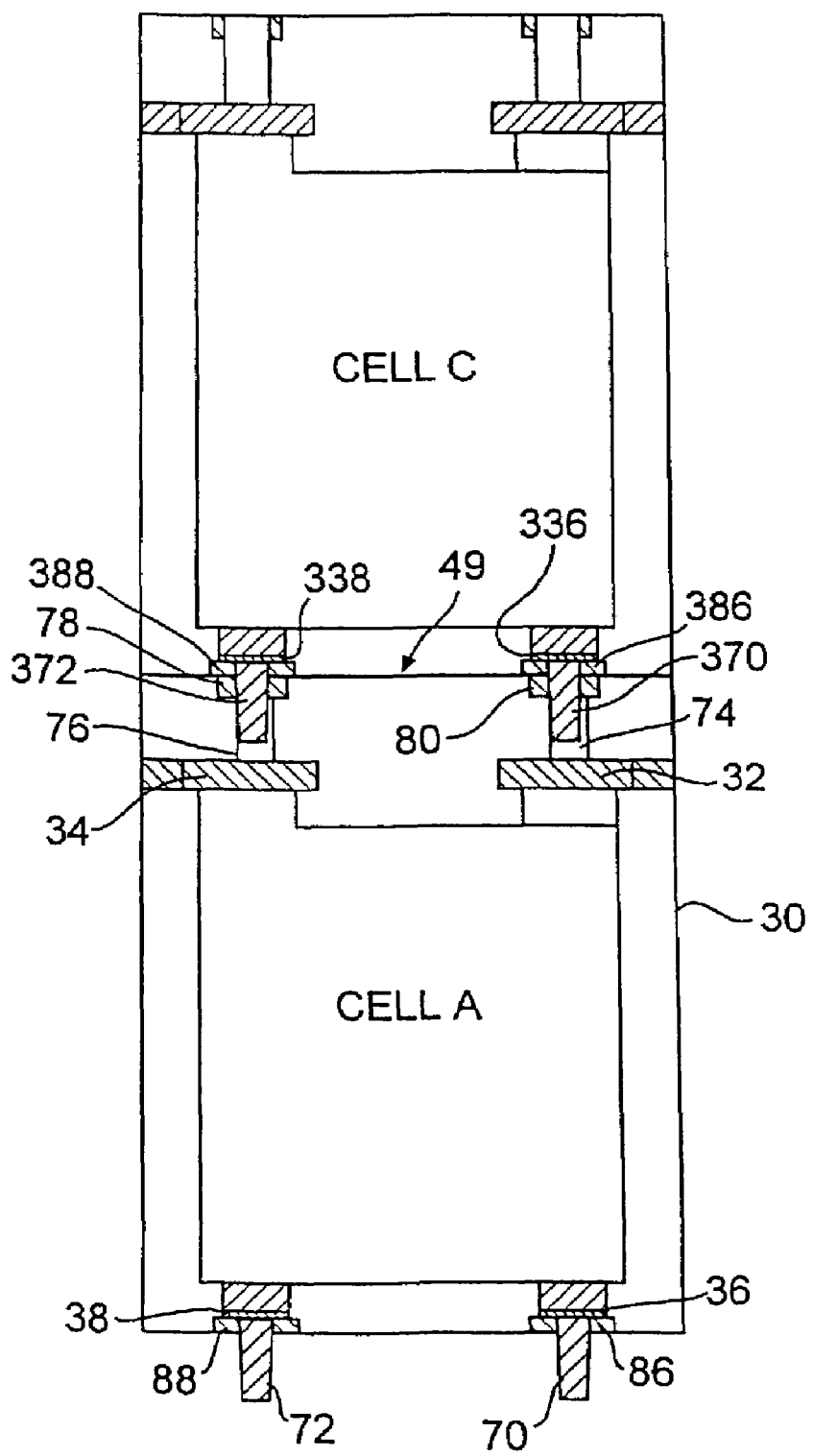
FIG. 9 is a sectioned side elevation of two electrolytic cells in electrical connection in parallel according to the present invention, wherein the exemplary cells are shown in a sectional view taken along line 4—4 of FIG. 3A to illustrates the plug-in pins and hollow plug-in post arrangement in accordance with the principles of the present invention.

To interconnect cells in parallel, the cells are connected vertically as illustrated in FIG. 9 using plug-in connector pins 70, 72 and hollow plug-in posts 74, 76. The parallel interconnection requires that the bus bars of two cells the same polarity be interconnected electrically. Thus, in FIG. 9, the hollow plug-in posts 74, 76 are provided at the top surface 49 of the cell casing 30 and are connected to the top plate bus bars 32, 34 through lead bushings 78, 80. The top of the lead bushings 78, 80 are flush with the top surface 49 of the cell casing 30. As shown in FIG. 9, a positive plug-in connector pin 70 and a negative plug-in connector pin 72 are connected to the positive bottom bus bar 36 and the negative bottom bus bar 38, respectively. From the bottom bus bars, the connector pins 70, 72 protrude through the bottom cell casing wall to the outside of the cell casing.

As is the case with the plug-in posts, there are provided lead bushings 86, 88 at the bottom wall through which the plug-in pins 70, 72 protrude. The outer surfaces of the lead bushings 86, 88 are flush with the bottom surface of the cell casing 30. Both sets of the plug-in posts and the plug-in connector pins as well as the lead bushings are made with electrically conductive materials.

It should be noted that if parallel interconnection is not desired, the hollow plug-in posts need not be provided, as illustrated in FIG. 3C. When parallel interconnection is desired, at least two hollow plug-in posts 74, 76 are provided at the top of each cell—one for each polarity. The number of posts may vary as a matter of a design choice. At the bottom of each cell, there are at least two plug-in connector pins associated with the plug-in posts—one for each polarity. The number of the plug-in connector pins is also variable as a matter of a design choice. For example, providing four pins (one from each of the four bottom bus bars) may provide better electrical conductivity with a network of external bus bars connecting all the cells in series, parallel or in series and parallel arrangements.

In FIG. 9, Cell A and Cell C are interconnected vertically in parallel by inserting the plug-in connector pins 370, 372 of Cell C into the hollow plug-in posts 74, 76 of Cell A. When the plug-in connector pins 370, 372 of Cell C are inserted into the hollow posts 74, 76 of Cell A, the polarity of each plug-in connector pins 370, 372 matches the polarity of the corresponding hollow posts 74, 76. In other words, the positive plug-in connector pin 370 and a negative plug-in connector pin 372 of Cell C are inserted respectively into the positive hollow plug-in posts 74 and the negative hollow plug-in posts 76 of Cell A. Hollow posts 74 and 76 may be spring loaded to assure better electrical connection.

When the Cell A and the Cell C are stacked together as shown in FIG. 9, the top surface of the Cell A is flush with the bottom surface of the Cell C. The weight of the Cell C provides sufficient pressure to connect physically the cells in such a manner that the bottom surface of the upper cell rests flush with the top surface of the bottom cell. The two cells are connected electrically because the electrically conductive plug-in posts and plug-in connector pins are connected to the electrodes via the bus bars. Thus, external connecting cables or connectors to interconnect two cells in parallel are not needed.

Figure 10:
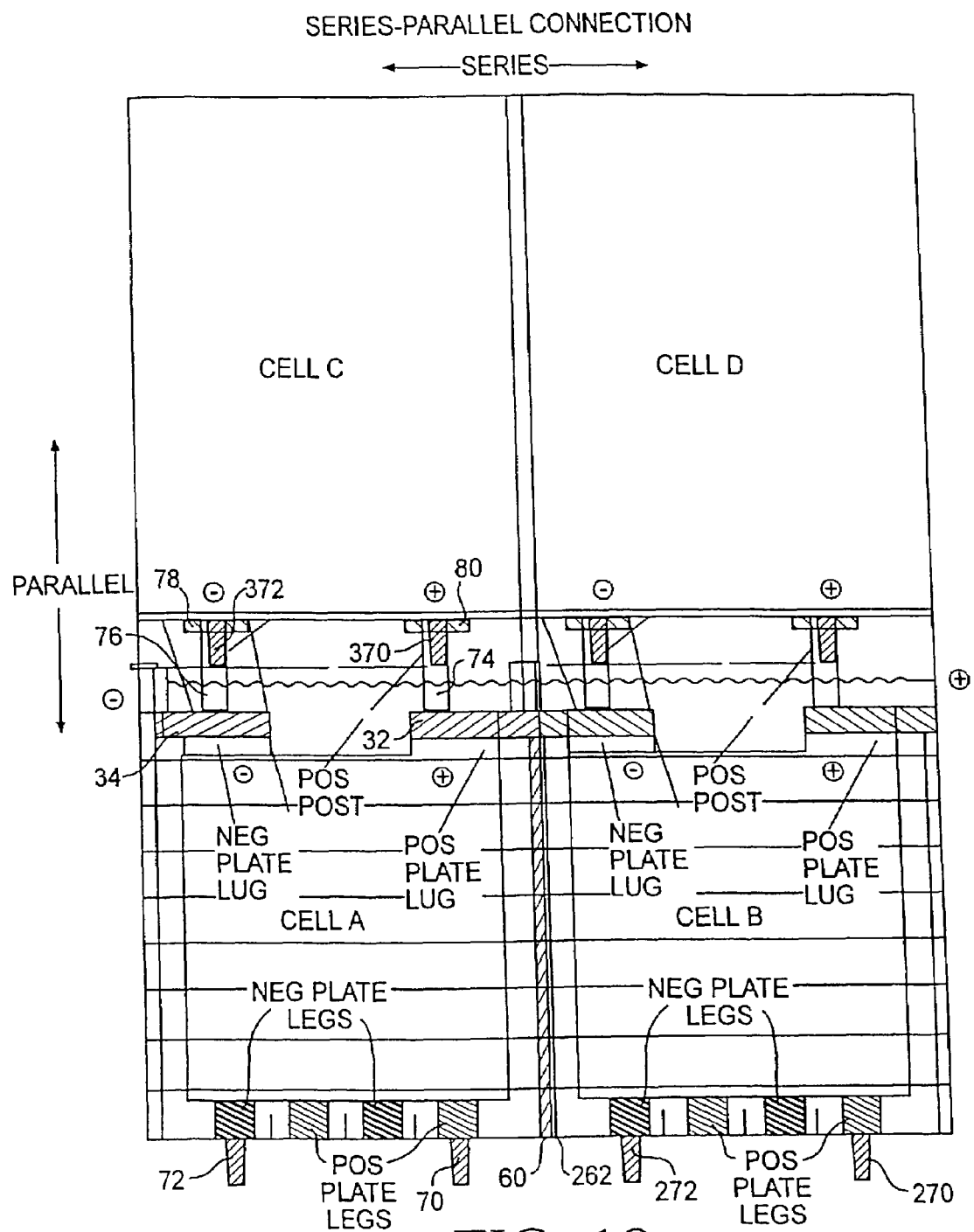
FIG. 10 is a side elevation, partially sectioned, of four electrolyte cells electrically connected both in series and in parallel in accordance with the present invention.

Using the tongue and groove configuration in conjunction with the plug-in post and connector pin arrangement, it is possible to interconnect multiple cells in series and parallel without external intercellular connectors. In the embodiment of the present invention illustrated in FIG. 10, Cells A, B, C, and D are connected in parallel and in series. Cell A and Cell B are connected by sliding the tongue 60 of Cell A into the groove 262 of Cell B. Likewise, Cell C and Cell D are connected in series by sliding the tongue 360 of Cell C into the groove 462 of Cell D. On the other hand, Cell A and Cell C are connected in parallel by plugging the connector pins 370, 372 of Cell C into the hollow plug-in posts 74, 76 of Cell A. Likewise, Cell B and Cell D are connected in parallel by plugging the connector pins 470, 472 of the Cell D into the hollow plug-in posts 274, 276 of Cell B. Thus, through the horizontal electrical connection (using the tongue and groove arrangement) and the vertical electrical connection (using the plug-in posts and connector pins), Cells A, B, C, and D are connected in series-parallel without external intercellular connectors.

Another advantage of the present invention, as briefly noted above, is that individual cells or multiple cells connected in a string can be removed quickly and easily from a string of batteries or cells so that they can be replaced without removing such intercellular connectors as cables or bus bars. As shown in FIG. 5B, removal of a cell or cells from a string of cells is only a matter of sliding the desired cell or-cells out of the string. If the cells are connected in parallel using the connector pins and plug-in posts, a cell can be removed simply by pulling the connector pins out of the plug-in posts. The cells may be equipped with handles to make it even more convenient to remove and insert cells.

Furthermore, individual cells can be plugged into networks of conductors housed in trays or channels to make it convenient to connect groups of cells in series, in parallel, or in series-parallel to motor controllers, chargers, testing or monitoring equipment. Also, it is possible to isolate each battery or cell from all the others for the purpose of monitoring its electrical performance, testing it or charging it independently from the other batteries or cells.

The battery according to another aspect of the present invention is equipped with an electrolyte recirculating and gas purging system. An electrolyte recirculation system is needed in a typical electrolyte battery to address problems caused during the electrochemical reaction between the electrodes and the electrolyte solution. Examples of these problems are polarization concentration, electrolyte stratification, and gas build-up.

Polarization concentration occurs when water produced during the discharge process concentrates at the positive plate. This can be seen from the chemical formula for the overall cell reaction:

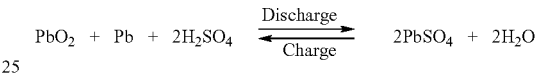

$$PbO_2 + Pb + 2H_2SO_4 \underset{\text{Charge}}{\overset{\text{Discharge}}{\rightleftharpoons}} 2PbSO_4 + 2H_2O$$

The polarization concentration affects the electrical power the cell can deliver because it lowers the conductivity of current from negative plates to positive plates.

Stratification, or separation of electrolyte into sulfuric acid and water, occurs when batteries stand for long periods of time without being used (charged or discharged). Sulfuric acid, which is heavier than water, gradually separates from the water and gravitates to the lower part of the cell, resulting in uneven concentration of electrolyte at the surface of the plates, thereby resulting poor cell performance. It is widely recognized by those skilled in the art that non-uniformity of the specific gravity of the electrolyte reduces the efficiency of the battery.

Gas purging is necessary in an electrolyte battery because the electrolysis during the charging and discharging processes produces hydrogen and oxygen gases. The problem with these gases is that gas bubbles build up at the plates as hydrogen and oxygen gases tend to cling to the surface of the plates. The bubble formation at the electrodes reduces the surface area of the electrodes available for reaction with the electrolyte, thereby reducing battery efficiency. Another serious problem resident in these gases is that some of the oxygen and hydrogen gases rise to the surface of the cell, increasing the possibility of internal explosion due to poor bus bar or post connection.

To address these problems, various forms of electrolyte recirculation systems have been provided including the one in applicant's own prior patent, U.S. Pat. No. 3,928,080. The present invention provides a novel electrolyte recirculation system in a battery.

Figure 11:
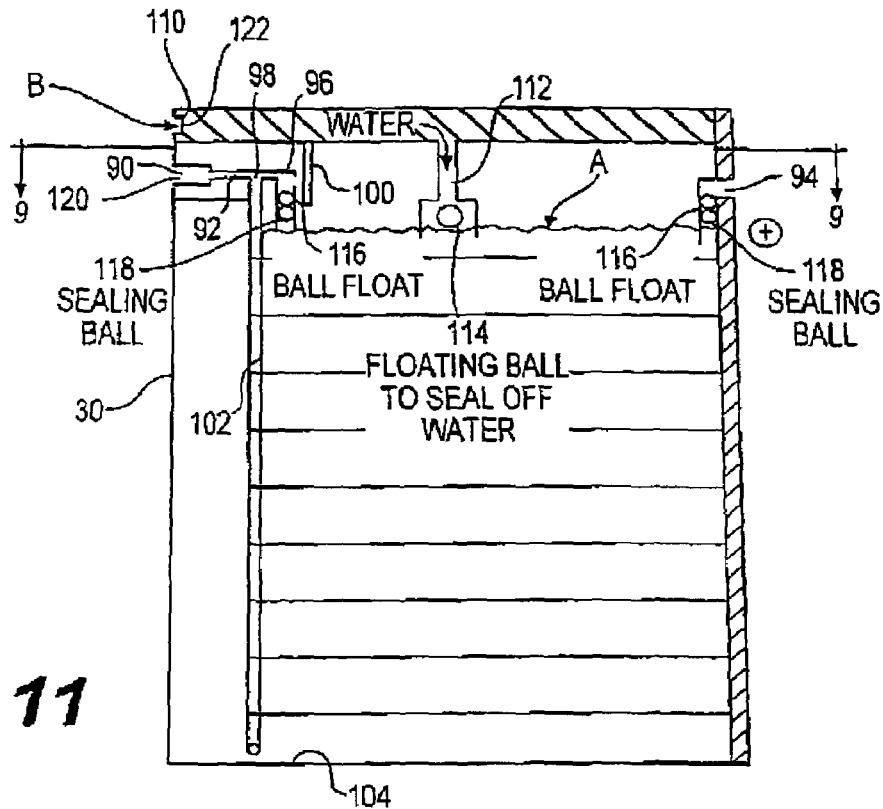
FIG. 11 is a sectioned side elevation of an electrolyte cell showing the reciculation and gas purging systems, as well as the automatic watering system, in accordance with the principles of the present invention.

FIG. 11 shows a cell 2 having an electrolyte solution filled inside a cell casing 30. When the plates are immersed in the cell casing 30, the electrolyte solution substantially fills the cell casing 30, but not completely. In FIG. 11, arrow A indicates the level to which the electrolyte rises. As shown in FIG. 11, an air inlet 90 and a venturi valve 92 are provided on one side of the cell casing 30, and an air outlet 94 is provided on the opposing side. The air inlet 90 extends through the sidewall near the upper wall of the cell casing 30, and the air outlet 94 extends through the opposite sidewall near the upper wall of the cell casing 30. The venturi valve 92 extends laterally from the air inlet 90 to the inside of the cell casing 30 so that it is preferably (but not necessarily) positioned above the electrolyte solution. A felt baffle 100 hangs fixedly from the inner surface of the top wall of the cell casing 30, and is positioned opposite the distal end 96 of the venturi valve 92. Between the air inlet 90 and the distal end 96 of the venturi valve 92, the venturi valve 92 has an opening 98 that is connected to an electrolyte suction tube 102 that extends vertically downward near the bottom inner surface 104 of the cell casing 30 as shown.

During the charge and discharge of the battery, compressed air is directed into the air inlet 90 on a continuous basis. The inflow of the compressed air into the inside of the cell casing 30 causes the electrolyte to be suctioned upward through the electrolyte suction tube 102. The electrolyte that is suctioned upwardly from the bottom of the cell through the suction tube 102 is then carried to the distal end 96 of the venturi valve 92 by the air. From the distal end 96, the electrolyte is sprayed out into the cell above the electrolyte level A. The felt baffle 100 deflects downward the air and acid spray. While the felt baffle 100 absorbs most of the acid, the air exits the cell through the air outlet 94. The existing air may enter the next cell or exit through a flame trap at the end of a string of the cells.

The inflow of compressed air thus recirculates the electrolyte continuously, as the higher specific gravity electrolyte is suctioned to the top of the cell through the electrolyte suction tube 102 from the bottom of the cell casing 30. Further, the continuous movement of the electrolyte prevents water from concentrating at the positive plate and thus lessens or even eliminates the polarization concentration at the electrode surfaces. Moreover, the continuous movement of the electrolyte deters the tendency of the oxygen and hydrogen gases to cling to the electrodes. Therefore, the possibility of internal explosion due to poor bus bar or post connection is lowered or eliminated.

One further advantage of the recirculation system is that the air entering the cell can be either heated or cooled. Accordingly, it is possible to keep the electrolyte at or near the optimum operating temperature during charge and discharge of the cell.

Yet another inventive aspect of the battery according to the present invention is a built-in automatic watering system. As shown in FIG. 11, the water indicated by arrow B enters the cell 2 through a water cover 110. The water is spread onto the electrolyte through a water tube 112, thereby replenishing the water lost from the cell during the charge and discharge of the cell. As the replenishing water enters the cell, the electrolyte level rises, forcing a floating ball 114 to rise. The floating ball 114 floats at the electrolyte level A and is positioned so that when the maximum height of the electrolyte is reached, the floating ball seals off the water tube 112. The specific gravity of this floating ball 114 is preferably less than about 1.00 at 80° F. The lowest value of the specific gravity of the electrolyte of a fully-discharged battery is preferably about 1.100 at 80° F.

In case the cell tips at a sharp angle or is turned upside down, ball floats 116 and sealing balls 118, which can be an integrally formed, are provided in an open mesh tube 120, positioned at opposite ends in such a way so as to allow closure of the air inlet 90 or air outlet 94. When the cell is tipped at a sharp angle, one of the ball floats 116 rises and forces the corresponding sealing ball 118 to close off the air inlet 90 at the venturi valve 92 or the air outlet 94. The specific gravity of the ball floats 116 is preferably less than about 1.00° at 80 F. The specific gravity of the sealing balls 118 is preferably more than about 1.400° at 80 F, with the maximum specific gravity of the electrolyte being about 1.300 at 80° F.

Figure 12:
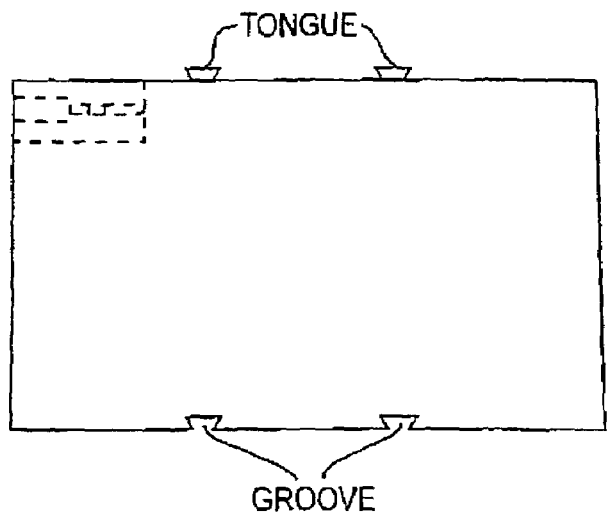
FIG. 12 is a cross-sectional view of the electrolytic cell taken along line 12—12 in FIG. 3C.

The water cover 110 and the principal cover 120 shown in FIG. 12 are equipped with convex "O" rings 122, preferably with a lip approximately 0.003 inches thick. The O-rings snap into the water inlet and air inlet side of the cell. Both of these inlets preferably have circular concave indentations of about 0.004 inches to accommodate the convex "O" rings so as to ensure water tight and air tight seals.

A top view of a cell according to the present invention shown in FIG. 3C with the recirculation system described above is illustrated in FIG. 12.

While the invention has been described in connection with what is presently considered to be the most practical and preferred embodiment, it is to be understood that the invention is not to be limited to the disclosed embodiments, but on the contrary is intended to cover in various modifications and equivalent arrangements.

I claim:

1. An electrical battery comprising:
    a plurality of voltage producing elements having positively charged elements and negatively charged elements;
    a battery case having the plurality of voltage producing elements therein, the battery case having a first sidewall and a second sidewall;
    a protrusion extending on an outer surface of the first sidewall, a portion of the protrusion being made of an electrically conductive material and electrically connected to one of the positively charged elements and the negatively charged elements; and
    a recess extending on an outer surface of the second sidewall, a portion of the recess being made of an electrically conductive material and electrically connected to the other of the positively charged elements and the negatively charged elements,
    wherein the protrusion and the recess are constructed and arranged such that
        the protrusion is shaped to be slidable into the recess and
        the portion of the protrusion made of an electrically conductive material is located vertically co-aligned with the portion of the recess made of an electrically conductive material.

2. An electrical battery comprising:
    a plurality of voltage producing elements comprising a plurality of positive plate elements and a plurality of negative plate elements immersed in an electrolytic solution;
    a positive connecting bar electrically connected to the plurality of positive plate elements;
    a negative connecting bar electrically connected to the plurality of negative plate elements;
    a battery case having the plurality of voltage producing elements therein, the battery case having a first sidewall and a second sidewall;
    a protrusion extending on an outer surface of the first sidewall, a portion of the protrusion being made of an electrically conductive material and electrically connected to one of the positive connecting bar and the negative connecting bar; and
    a recess extending on an outer surface of the second sidewall, a portion of the recess being made of an electrically conductive material and electrically connected to the other of the positive connecting bar and the negative connecting bar, wherein the protrusion and the recess are constructed and arranged such tat
the protrusion is shaped to be slidable into the recess and
the portion of the protrusion made of an electrically conductive material is located vertically co-aligned with the portion of the recess made of an electrically conductive material.

3. An electrical battery as in claim 2, wherein the positive plate elements and the negative plate elements are made of lead foam.

4. An electrical battery as in claim 1 or claim 2, further comprising at least one additional protrusion extending on the outer surface of the first sidewall and at least one additional recess extending on the outer surface of the second sidewall, wherein the additional protrusion and the additional recess are constructed and arranged such that the additional protrusion is shaped to be slidable into the additional recess.

5. An electrical battery as in claim 4, wherein three protrusions extend on the outer surface of the first sidewall, and three recesses corresponding to the additional protrusions extend on the outer surface of the second sidewall.

6. An electrical battery as in claim 1 or claim 2, wherein the protrusion and the recess extend substantially vertically.

7. An electrical battery as in claim 6, wherein the first sidewall has a first sidewall upper edge and a first sidewall lower edge, and the second sidewall has a second sidewall upper edge and a second sidewall lower edge, the protrusion extending substantially from the first sidewall upper edge to the first sidewall lower edge, and the recess extending substantially from the second sidewall upper edge to the second sidewall lower edge.

8. An electrical battery as in claim 1 or claim 2, wherein a cross-section of the protrusion is substantially a trapezoidal tongue shape, and a cross-section of the recess is substantially a trapezoidal groove shape.

9. An electrical battery as in claim 1 or claim 2, wherein a cross-section of the protrusion is substantially an annular convex shape, and a cross-section of the recess is substantially an annular concave shape.

10. An electrical battery as in claim 1 or claim 2, wherein each of the portion of the protrusion made of an electrically conductive material and the portion of the recess made of an electrically conductive material is made of at least one of lead and a highly conductive lead-alloy.

11. An electrical battery as in claim 10, wherein each of the portion of the protrusion and the portion of the recess made of an electrically conductive material is silver-plated.

12. An electrical battery as in claim 2, wherein the portion of the protrusion made of an electrically conductive material and the one of the positive connecting bar and the negative connecting bar are formed integrally.

13. An electrical battery as in claim 2, wherein the portion of the recess made of an electrically conductive material and the other of the positive connecting bar and the negative connecting bar are formed integrally.

14. An electrical battery as in claim 2, wherein
the positive connecting bar and the negative connecting bar each further includes a connecting bar lateral extension;
the portion of the protrusion made of an electrically conductive material and the one of the positive connecting bar and the negative connecting bar are connected by the connecting bar lateral extension of the one of positive connecting bar and the negative connecting bar; and
the portion of the recess made of an electrically conductive material and the other of the positive connecting bar and the negative connecting bar are connected by the connecting bar lateral extension of the other of positive connecting bar and the negative connecting bar.

15. An electrical battery as in claim 1 or claim 2, wherein the battery case further comprises a handle having one end attached to third sidewall of the battery case and another end attached to a sidewall opposite the third sidewall.

16. A multi-cellular electrical battery comprising first and second electrical batteries, each of first and second electrical batteries comprising:
a plurality of voltage producing elements having positively charged elements and negatively charged elements;
a battery case having the plurality of voltage producing elements therein, the battery case having a first sidewall and a second sidewall;
a protrusion extending on an outer surface of the fast sidewall, a portion of the protrusion being made of an electrically conductive material and electrically connected to one of the positively charged elements and the negatively charged elements; and
a recess extending on an outer surface of the second sidewall, a portion of the recess being made of an electrically conductive material and electrically connected to the other of the positively charged elements and the negatively charged elements,
wherein the protrusion of the first electrical battery and the recess of the second electrical battery are constructed and ranged such that
the protrusion of the first electrical battery is slidable into the recess of the second electrical battery,
the portion of the protrusion made of an electrically conductive material of the first electrical battery contacts the portion of the recess made of an electrically conductive material of the second battery when the protrusion of the first electrical battery is slid into the recess of the second electrical battery.

17. A multi-cellular electrical battery comprising first and second electrical batteries, each of first and second electrical batteries comprising:
a plurality of voltage producing elements comprising a plurality of positive plate elements and a plurality of negative plate elements immersed in an electrolytic solution;
a positive connecting bar electrically connected to the plurality of positive plate elements;
a negative connecting bar electrically connected to the plurality of negative plate elements;
a battery case having the plurality of voltage producing elements therein, the battery case having a first sidewall and a second sidewall;
a protrusion extending on an outer surface of the first sidewall, a portion of the protrusion being made of an electrically conductive material and electrically connected to one of the positive connecting bar and the negative connecting bar; and
a recess extending on an outer surface of the second sidewall, a portion of the recess being made of an electrically conductive material and electrically connected to the other of the positive connecting bar and the negative connecting bar,
wherein the protrusion of the first electrical battery and the recess of the second electrical battery are constructed and arranged such tat the protrusion of the first electrical battery is slidable into the recess of the second electrical battery, the portion of the protrusion made of an electrically conductive mated al of the first electrical battery contacts the portion of the recess made of an electrically conductive material of the second battery when the protrusion of the first electrical battery is slid into the recess of the second electrical battery.

18. A multi-cellular electrical battery as in claim 17, wherein the positive plate elements and the negative plate elements are made of lead foam.

19. A multi-cellular electrical battery as in claim 16 or claim 17, wherein when the portion of the protrusion made of an electrically conductive material of the first electrical battery is in contact with the portion of the recess made of an electrically conductive material of the second battery, the first electrical battery and the second electrical battery are electrically connected in series so tat the voltage across the first and second electrical batteries is the sum of the individual battery voltage.

20. A multi-cellular electrical battery as in claim 16 or claim 17, wherein the protrusion of the first electrical battery and the recess of the second electrical battery are constructed and arranged so tat when the protrusion of the first electrical battery is slid into the recess of the second electrical battery, the protrusion and the recess are in a tight-fitting relationship restricting any substantial lateral movement of the first and second electrical batteries with respect to each other.

21. A multi-cellular electrical battery as in claim 16 or claim 17, further comprising at least one additional protrusion extending on the outer surface of the first sidewall and at least one additional recess extending on the outer surface of the second sidewall, wherein the additional protrusion and the additional recess are constructed and arranged such that the additional protrusion is shaped to be slidable into the additional recess.

22. A multi-cellular electrical battery as in claim 16 or claim 17 wherein three protrusions extend on the outer surface of the first sidewall, and three recesses corresponding to the additional protrusions extend on the outer surface of the second sidewall.

23. A multi-cellular electrical battery as in claim 16 or claim 17, wherein the protrusion and the recess extend substantially vertically.

24. A multi-cellular electrical battery as in claim 23, wherein the first sidewall has a first sidewall upper edge and a first sidewall lower edge, and the second sidewall has a second sidewall upper edge and a second sidewall lower edge, the protrusion extending substantially from the first sidewall upper edge to the first sidewall lower edge, and the recess extending substantially from the second sidewall upper edge to the second sidewall lower edge.

25. A multi-cellular electrical battery as in claim 16 or claim 17, wherein a cross-section of the protrusion is substantially a trapezoidal tongue shape, and a cross-section of the recess is substantially a trapezoidal groove shape.

26. A multi-cellular electrical battery as in claim 16 or claim 17, wherein a cross-section of the protrusion is substantially an annular convex shape, and a cross-section of the recess is substantially an annular concave shape.

27. A multi-cellular electrical battery as in claim 16 or claim 17, wherein each of the portion of the protrusion made of an electrically conductive material and the portion of the recess made of an electrically conductive material is made of at least one of lead and a highly conductive lead-alloy.

28. A multi-cellular electrical battery as in claim 27, wherein each of the portion of the protrusion and the portion of the recess made of an electrically conductive material is silver-plated.

29. A multi-cellular electrical battery as in claim 18, wherein the portion of the protrusion made of an electrically conductive material and the one of the positive connecting bar and the negative connecting bar are formed integrally.

30. A multi-cellular electrical battery as in claim 18, wherein the portion of the recess made of an electrically conductive material and the other of the positive connecting bar and the negative connecting bar are formed integrally.

31. A multi-cellular electrical battery as in claim 18, wherein the positive connecting bar and the negative connecting bar each further includes a connecting bar lateral extension;

the portion of the protrusion made of an electrically conductive material and the one of the positive connecting bar and the negative connecting bar are connected by the connecting bar lateral extension of the one of positive connecting bar and the negative connecting bar; and the portion of the recess made of an electrically conductive material and the other of the positive connecting bar and the negative connecting bar are connected by the connecting bar lateral extension of the other of positive connecting bar and the negative connecting bar.

32. An electrical battery as in claim 16 or claim 17, wherein the battery case further comprises a handle having one end attached to third sidewall of the battery case and another end attached to a sidewall opposite the third sidewall.

33. An electrical battery comprising:

a plurality of voltage producing elements having positively charged elements and negatively charged elements;

a battery case having the plurality of voltage producing elements therein, the battery case having a first sidewall, a second sidewall, an upper wall and a bottom wall opposite the upper wall;

a protrusion extending on an outer surface of the first sidewall, a portion of the protrusion being made of an electrically conductive material and electrically connected to one of the positively charged elements and the negatively charged elements;

a recess extending on an outer surface of the second sidewall, a portion of the recess being made of an electrically conductive material and electrically connected to the other of the positively charged elements and the negatively charged elements;

a plurality of hollow posts electrically connected to the voltage producing elements, a plurality of hollow posts extending from a top surface of to upper wall through the upper wall into inside of the battery case; and a plurality of plug-in pins electrically connected to the voltage producing elements and extending from inside of the battery case through the bottom wall to outside of the bottom wall, wherein the protrusion and the recess arc constructed and arranged such that the protrusion is shaped to be slidable into the recess and the portion of the protrusion made of an electrically conductive material is located vertically co-aligned with the portion of the recess made of an electrically conductive material, and wherein the hollow posts and the plug-in pins are constructed and arranged such that the plug-in pins are shaped to be inserted into the hollow posts.

34. An electrical battery comprising:
a plurality of voltage producing elements comprising a plurality of positive plate elements and a plurality of negative plate elements immersed in an electrolytic solution;
a positive connecting bar electrically connected to the plurality of positive plate elements;
a negative connecting bar electrically connected to the plurality of negative plate elements;
a battery case having the plurality of voltage producing elements therein, the battery case having a first sidewall, a second sidewall, an upper wall and a bottom wall opposite the upper wall;
a protrusion extending on an outer surface of the first sidewall, a portion of the protrusion being made of an electrically conductive material and electrically connected to one of the positive connecting bar and the negative connecting bar;
a recess extending on an outer surface of the second sidewall, a portion of the recess being made of an electrically conductive material and electrically connected to the other of the positive connecting bar and the negative connecting bar;
a plurality of hollow posts electrically extending from a top surface of the upper wall through the upper wall into inside of the battery case, the plurality of hollow posts including at least one positive hollow post electrically connected to a positive upper connecting bar and at least one negative hollow post electrically connected to a negative upper connecting bar; and
a plurality of plug-in pins extending from inside of the battery case Through the bottom wall to outside of the bottom wall, the plurality of plug-in pins including ax least one positive plug-in post electrically connected to the positive lower connecting bar and at least one negative plug-in post electrically connected to the negative lower connecting bar,
wherein the protrusion and the recess are constructed and arranged such that
the protrusion is shaped to be slidable into the recess and
the portion of the protrusion made of an electrically conductive material is located vertically co-aligned with the portion of the recess made of an electrically conductive material, and
wherein the hollow posts and the plug-in pins are constructed and arranged such that the plug-in pins are shaped to be inserted into the hollow posts.

35. An electrical battery as in claim 34, wherein the positive place elements and the negative plate elements are made of lead foam.

36. An electrical battery as in claim 33 or claim 34, further comprising at least one additional protrusion extending on the outer surface of the first sidewall and at least one additional recess extending on the outer sin-thee of the second sidewall, wherein the at least one additional protrusion and the at least one additional recess are constructed and arranged such That the at least one additional protrusion is shaped to be slidable into the at least one additional recess.

37. An electrical battery as in claim 36 wherein three protrusions extend on the outer surface of the first sidewall, and three recesses corresponding to the additional protrusions extend on the outer surface of the second sidewall.

38. An electrical battery as in claim 33 or claim 34, wherein the protrusion and the recess extend substantially vertically.

39. An electrical battery as in claim 38, wherein the first sidewall has a first sidewall upper edge and a first sidewall lower edge, and the second sidewall has a second sidewall upper edge and a second sidewall lower edge,
the protrusion extending substantially from the first sidewall upper edge to the first sidewall lower edge, and
the recess extending substantially from the second sidewall upper edge to the second sidewall lower edge.

40. An electrical battery as m claim 33 or claim 34, wherein a cross-section of the protrusion is substantially a trapezoidal tongue shape, and a cross-section of the recess is substantially a trapezoidal groove shape.

41. An electrical battery as m claim 33 or claim 34, wherein a cross-section of the protrusion is substantially an annular convex shape, and a cross-section of the recess is substantially an annular concave shape.

42. An electrical battery as in claim 33 or claim 34, wherein each of the portion of the protrusion made of an electrically conductive material and the portion of the recess made of an electrically conductive material is made of at least one of lead and a highly conductive lead-alloy.

43. An electrical battery as in claim 33 or claim 34, wherein the portion of the recess made of an electrically conductive material is silver-plated.

44. An electrical battery as in claim 34, wherein the portion of the protrusion made of an electrically conductive material and the one of the positive connecting bar and the negative connecting bar are formed integrally.

45. An electrical battery as in claim 34, wherein the portion of the recess made of an electrically conductive material and the other of the positive connecting bar and the negative connecting bar are formed integrally.

46. An electrical battery as in claim 34, wherein
the positive connecting bar and the negative connecting bar each further includes a connecting bar lateral extension;
the portion of the protrusion made of an electrically conductive material and the one of the positive connecting bar and the negative connecting bar are connected byte connecting bar lateral extension of the one of positive connecting bar and the negative connecting bar; and
the portion of the recess made of an electrically conductive material and the other of the positive connecting bar and to negative connecting bar are connected by the connecting bar lateral extension of the other of positive connecting bar and the negative connecting bar.

47. An electrical battery as in claim 33 or claim 34, wherein the battery case further comprises a handle having one end attached to third sidewall of the battery case and another end attached to a sidewall opposite the third sidewall.

48. An electrical battery as in claim 33 or claim 34, wherein the bottom wall further comprises a plurality of bushings through which the plurality of plug-in pins extend.

49. An electrical battery as in claim 48 wherein the plurality of bushings are made of electrically conductive material.

50. An electrical battery as in claim 48 wherein the plurality of bushings are flush with an outer surface of the bottom wall.

51. An electrical battery as in claim 33 or claim 34 wherein the plurality of hollow posts and the plurality of plug-in pins arc made of electrically conductive material.

52. An electrical battery as in claim 33 or claim 34, wherein at least one hollow post is provided for each of the plurality of the plug-in pins.

53. A multi-cellular electrical battery comprising first, second and third electrical batteries, each of first, second and third electrical batteries comprising:
- a plurality of voltage producing elements having positively charged elements and negatively charged elements;
- a battery case having the plurality of voltage producing elements therein, the battery case having a first sidewall, a second sidewall, an upper wall and a bottom wall opposite the upper wall;
- a protrusion extending on an outer surface of the first sidewall, a portion of the protrusion being made of an electrically conductive material and electrically connected to one of the positively charged elements and the negatively charged elements;
- a recess extending on an outer surface of the second sidewall, a portion of the recess being made of an electrically conductive material and electrically connected to the other of the positively charged elements and the negatively charged elements;
- a plurality of hollow posts electrically connected to the voltage producing elements, a plurality of hollow posts extending from a top surface of the upper wall through the tipper wall into inside of the battery case; and
- a plurality of plug-in pins electrically connected to the voltage producing elements and extending from inside of the battery case through the bottom wall to outside of the bottom wall,
- wherein the protrusion of the first electrical battery and the recess of the second electrical battery are constructed and arranged such that
  - the protrusion of the first electrical battery is slidable into the recess of the second electrical battery, and
  - the portion of the protrusion made of an electrically conductive material of the first electrical battery contacts the portion of the recess made of an electrically conductive material of the second battery when the protrusion of the first electrical battery is slid into the recess of the second electrical battery; and
- wherein the plurality of hollow posts of the first electrical battery and the plurality of plug-in pins of the third electrical battery are constructed and arranged such that
  - the plug-in pins of the first electrical battery are shaped to be inserted into the hollow posts of the third electrical battery;
  - the first and third electrical batteries are in electrical interconnection when the plurality of the plug-in pins of the first electrical battery are inserted into the plurality of hollow posts of the third electrical battery.

54. A multi-cellular electrical battery comprising first, second and third electrical batteries, each of first, second and third electrical batteries comprising:
- a plurality of voltage producing elements comprising a plurality of positive plate elements and a plurality of negative plate elements immersed in an electrolytic solution;
- a positive connecting bar electrically connected to the plurality of positive plate elements;
- a negative connecting bar electrically connected to the plurality of negative plate elements;
- a battery case having the plurality of voltage producing elements therein, the battery case having a first sidewall, a second sidewall, an upper wall and a bottom wall opposite the upper wall;
- a protrusion extending on an outer surface of the first sidewall, a portion of the protrusion being made of an electrically conductive material and electrically connected to one of the positive connecting bar and the negative connecting bar,
- a recess extending on an outer surface of the second sidewall, a portion of the recess being made of an electrically conductive material and electrically connected to the other of the positive connecting bar and the negative connecting bar;
- a plurality of hollow posts electrically extending from a top surface of the upper wall through the upper wall into inside of the battery case, the plurality of hollow posts including at least one positive hollow post electrically connected to a positive upper connecting bar and at least one negative hollow post electrically connected to a negative upper connecting bar; and
- a plurality of plug-in pins extending from inside of the battery case through the bottom wall to outside of the bottom wall, the plurality of plug-in pins including at least one positive plug-in post electrically connected to the positive lower connecting bar and at least one negative plug-in post electrically connected to the negative lower connecting bar,
- wherein the protrusion of the first electrical battery and the recess of the second electrical battery are constructed and arranged such that
  - the protrusion of the first electrical battery is slidable into the recess of the second electrical battery, and
  - the portion of the protrusion made of an electrically conductive material of the first electrical battery contacts the portion of the recess made of an electrically conductive material of the second battery when the protrusion of the first electrical battery is slid into the recess of the second electrical battery; and
- wherein the plurality of hollow posts of the first electrical battery and the plurality of plug-in pins of the third electrical battery are constructed and arranged such that
  - the plug-in pins of the first electrical battery are shaped to be inserted into the hollow posts of the third electrical battery;
  - the first and third electrical batteries are in electrical interconnection when the plurality of the plug-in pins of the first electrical battery are inserted into the plurality of hollow posts of the third electrical battery.

55. A multi-cellular electrical battery as in claim 54, wherein the positive plate elements and the negative plate elements are made of lead foam.

56. A multi-cellular electrical battery as in claim 53 or claim 54, wherein when the portion of the protrusion made of an electrically conductive material of the first electrical battery is in contact with the portion of the recess made of an electrically conductive material of the second battery, the first electrical battery and the second electrical battery are electrically connected in series so that the voltage across the first and second electrical batteries is the sum of the individual battery voltage.

57. A multi-cellular electrical battery as in claim 53 or claim 54, wherein the protrusion of the first electrical battery and the recess of the second electrical battery are constructed and arranged so that when the protrusion of the first electrical battery is slid into the recess of the second electrical battery, the protrusion and the recess are in a light-fitting relationship restricting any substantial lateral movement of the first and second electrical batteries with respect to each other.

58. A multi-cellular electrical battery as in claim 53 or claim 54, Thither comprising at least one additional protrusion extending on the outer surface of the first sidewall and at least one additional recess extending on the outer surface of the second sidewall, wherein the at least one additional protrusion and the at least one additional recess are constructed and arranged such that the at least one additional protrusion is shaped to be slidable into the at least one additional recess.

59. A multi-cellular electrical battery as in claim 53 or claim 54 wherein three protrusions extend on the outer surface of the first sidewall, and three recesses corresponding to the additional protrusions extend on the outer surface of the second sidewall.

60. A multi-cellular electrical battery as in claim 53 or claim 54, wherein the protrusion and the recess extend substantially vertically.

61. A multi-cellular electrical battery as in claim 60, wherein the first sidewall has a first sidewall upper edge and a first sidewall lower edge, and the second sidewall has a second sidewall upper edge and a second sidewall lower edge,
the protrusion extending substantially from the first sidewall upper edge to the first sidewall lower edge, and
the recess extending substantially from the second sidewall upper edge to the second sidewall lower edge.

62. A multi-cellular electrical battery as in claim 53 or claim 54, wherein a cross-section of the protrusion is substantially a trapezoidal tongue shape, and a cross-section of the recess is substantially a trapezoidal groove shape.

63. A multi-cellular electrical battery as in claim 53 or claim 54, wherein a cross-section of the protrusion is substantially an annular convex shape, and a cross-section of the recess is substantially an annular concave shape.

64. A multi-cellular electrical battery as in claim 53 or claim 54, wherein each of the portion of the protrusion made of an electrically conductive material and the portion of the recess made of an electrically conductive material is made of at least one of lead and a highly conductive lead-alloy.

65. A multi-cellular electrical battery as in claim 54, wherein the portion of the recess made of an electrically conductive material is silver-plated.

66. A multi-cellular electrical battery as in claim 54, wherein the portion of the protrusion made of an electrically conductive material and the one of the positive connecting bar and the negative connecting bar are formed integrally.

67. A multi-cellular battery as in claim 54, wherein the portion of the recess made of an electrically conductive material and the other of the positive connecting bar and the negative connecting bar are formed integrally.

68. An electrical battery as in claim 54, wherein
the positive connecting bar and the negative connecting bar each further includes a connecting bar lateral extension;
the portion of the protrusion made of an electrically conductive material and the one of the positive connecting bar and the negative connecting bar are connected by the connecting bar lateral extension of the one of positive connecting bar and the negative connecting bar; and
the portion of the recess made of an electrically conductive material and the other of the positive connecting bar and the negative connecting bar are connected by the connecting bar lateral extension of the other of positive connecting bar and the negative connecting bar.

69. An electrical battery as in claim 53 or claim 54, wherein the battery case further comprises a handle having one end attached to third sidewall of the battery case and another end attached to a sidewall opposite the third sidewall.

70. A multi-cellular battery as in claim 53 or claim 54, wherein the bottom wall further comprises a plurality of bushings through which the plurality of plug-in pins extend.

71. A multi-cellular battery as in claim 70 wherein the plurality of bushings are made of electrically conductive material.

72. A multi-cellular battery as in claim 70 wherein the plurality of bushings are flush with an outer surface of the bottom wall.

73. A multi-cellular battery as in claim 53 or claim 54 wherein the plurality of hollow posts are made of electrically conductive material.

74. A multi-cellular battery as in claim 53 or claim 54 wherein the plurality of plug-in pins are made of electrically conductive material.

75. A multi-cellular battery as in claim 53 or claim 54 wherein at least one hollow post is provided for each of the plurality of the plug-in pins.

76. A multi-cellular battery as in claim 53 or claim 54 wherein when the plurality of the plug-in pins of The first electrical battery are inserted into the plurality of hollow posts of the second electrical battery, all the plug-in pins of the first electrical battery of the same polarity electrically connect with all the hollow posts of the second electrical battery of the opposite polarity.

77. A multi-cellular battery as in claim 53 or claim 54 wherein when the plurality of the plug-in pins of the first electrical battery are inserted into the plurality of hollow posts of the second electrical battery, the at least one positive hollow post of the first electrical battery is in electrical connection with the at least one negative plug-in pin of the second electrical battery, and the at least one negative hollow post of the first electrical battery is in electrical connection with the at least one positive plug-in pin of the second electrical battery.

78. An electrical battery comprising:
a battery case having a first sidewall, a second sidewall opposite the first sidewall, an upper wall and a bottom wall opposite the upper wall;
a plurality of voltage producing elements in the battery case comprising positive plate elements and a plurality of negative plate elements immersed in an electrolyte solution, the electrolyte solution substantially filling the inside of the battery case;
an air inlet formed through the first sidewall proximate to an upper end of the first sidewall above a surface of the electrolyte solution, the air inlet being exposed to outside of the battery case;
a venturi valve having a proximal end connected to the air inlet and a distal end hanging substantially over the electrolyte solution inside the battery case, the venturi valve laterally extending from the proximal end to the distal end;

an electrolyte suction tube having
an upper end connected to the venturi valve between the proximal end of the venturi valve and the distal end of the venturi valve, and
a lower end near an inner surface of the bottom wall of the battery case, the lower end having an orifice;
a felt baffle fixedly connected to an inner surface of the upper wall and extending downward toward near the electrolyte solution, the felt baffle facing the distal end of the venturi valve near and opposite the distal end of the venturi valve; and
an air outlet formed through the second sidewall proximate to an upper end of the second sidewall above the surface of the electrolyte solution, the air outlet being exposed to an outside of the battery case.

79. An electrical battery comprising:
a battery case having a first sidewall, a second sidewall opposite the first sidewall, an upper wall and a bottom wall opposite the upper wall;
a plurality of voltage producing elements in the battery case comprising a plurality of positive plate elements and a plurality of negative plate elements immersed in an electrolyte solution, the electrolyte solution substantially filling the inside of the battery case;
a floating ball that floats on a surface of the electrolyte solution;
a water tube having:
a water inlet in the first sidewall exposed to an outside of the battery case;
a water outlet inside the battery case disposed over the electrolyte solution, the water outlet having an orifice adapted to be closed when the floating ball floats up in response to an increase in an amount of the electrolyte solution inside the battery case;
a laterally extending portion extending between a laterally extending portion proximal end connected to the water inlet and a laterally extending portion distal end; and
a vertically extending portion having a vertically extending portion proximal end and a vertically extending portion distal end and extending downwardly from the laterally extending portion distal end toward the electrolyte solution,
the vertically extending portion proximal end being connected to the laterally extending portion distal end, and
the vertically extending portion distal end being connected to the water outlet;
a floating ball house provided at the vertically extending portion distal end and containing the floating ball therein and adapted to allow vertical movements of the floating ball within in response to changes in a surface level of the electrolyte solution in the battery case.

80. An electrical battery as in claim 78 or claim 79, wherein the positive plate elements and the negative plate elements are made of lead foam.

81. An electrical battery as in claim 79 wherein the floating ball has a specific gravity of less than about 1.0 at 80° F.

82. An electrical battery as in claim 79 wherein the electrolyte solution has a specific gravity of greater than about 1.1 at 80° F.

83. An electrical battery as in claim 79 wherein the floating ball has a specific gravity of less than about 1.0 at 80° F., and the electrolyte solution has a specific gravity of greater than about 1.1 at 80° F.

84. An electrical battery comprising:
a battery case having a first sidewall, a second sidewall opposite the first sidewall, an upper wall and a bottom wall opposite the upper wall;
a plurality of voltage producing elements in the battery case comprising positive plate elements and a plurality of negative plate elements immersed in an electrolyte solution, the electrolyte solution substantially filling the inside of the battery case;
an air outlet formed through the first sidewall proximate to an upper end of the first sidewall above a surface of the electrolyte solution, the air outlet being exposed to an outside of the battery case and having an opening inside the battery case for an outflow of air; and
a first open mesh tube disposed opposite the air outlet having therein a first float tat floats on the surface of the electrolyte solution and a first sealing ball disposed above the first float, the first sealing ball moving in response to the movement of the first float,
wherein the first sealing ball is arranged in the first open mesh tube such tat the opening of the air outlet is sealable by the first sealing ball when the first sealing ball is floated upward in response to a rise in a surface level of the electrolyte solution.

85. An electrical battery as in claim 84, wherein the positive plate elements and the negative plate elements are made of lead foam.

86. An electrical battery comprising:
a battery case having a first sidewall, a second sidewall opposite the first sidewall, an upper wall and a bottom wall opposite the upper wall;
a plurality of voltage producing elements in the battery case comprising positive plate elements and a plurality of negative plate elements immersed in an electrolyte solution, the electrolyte solution substantially filling the inside of the battery case;
an air inlet formed through the first sidewall proximate to an upper end of the first sidewall above a surface of the electrolyte solution, the air inlet being exposed to an outside of the battery case and having an opening inside the battery case for an inflow of air; and
a first open mesh tube disposed opposite the air inlet having therein a first float that floats on the surface of the electrolyte solution and a first sealing ball disposed above the first float, the first sealing ball moving in response to the movement of the first float,
wherein the first sealing bail is arranged in the first open mesh tube such that the opening of the air inlet is sealable by the first sealing ball when the first sealing ball is floated upward in response to a rise in a surface level of the electrolyte solution.

87. An electrical battery as in claim 86 further comprising:
an air outlet formed through the second sidewall proximate to an upper end of the second sidewall above the surface of the electrolyte solution, the air outlet being exposed to an outside of the battery case and having an opening inside the battery case for an outflow of air; and
a second open mesh tube disposed opposite the air outlet having therein a second float that floats on the surface of the electrolyte solution and a second sealing ball disposed above the second float, the second sealing ball moving in response to the movement of the second float,
wherein the second sealing ball is arranged in the second open mesh tube such that the opening of the air outlet is sealable by the second sealing ball when the second sealing ball is floated upward in response to a rise in a surface level of the electrolyte solution.

88. An electrical batten!as in claim 86 further comprising a venturi valve having a proximal end connected to the air inlet and a distal end hanging substantially over the electrolyte solution inside the battery case, the distal end of the venturi valve including the opening of the air inlet inside the battery case.

89. An electrical battery as in claim 86 or claim 87 wherein the first float and the first sealing ball are integrally formed.

90. An electrical battery as in claim 87 wherein the second float and the second sealing ball are integrally formed.

91. An electrical battery as in claim 86 or claim 87, wherein the positive plate elements and the negative plate elements are made of lead foam.

92. An electrical battery as in claim 86 or claim 87 wherein the first float has a specific gravity of less than about 1.0 at 80° F., the first sealing ball has a specific gravity of greater than about 1.4 at 80° F., and the electrolyte solution has a specific gravity of about 1.3 at 80° F.

93. An electrical battery as in claim 87 wherein the second float has a specific gravity of less than about 1.0 at 80° F., the second sealing ball has a specific gravity of greater than about 1.4 at 80° F., and the electrolyte solution has a specific gravity of about 1.3 at 80° F.

94. An electrical battery comprising:
- a battery case having a first sidewall, a second sidewall opposite the first sidewall, an upper wall and a bottom wall opposite the upper wall;
- a plurality of voltage producing elements in the battery case comprising positive plate elements and a plurality of negative plate elements immersed in an electrolyte solution, the electrolyte solution substantially filling the inside of the battery case;
- an air inlet formed through the first sidewall proximate to an upper end of the first sidewall above a surface of the electrolyte solution, the air inlet being exposed to an outside of the battery case am!having an opening inside the battery case for an inflow of air;
- a venturi valve having a proximal end connected to the air inlet and a distal end hanging substantially over to electrolyte solution inside the battery case, the venturi valve laterally extending from the proximal end to the distal end;
- an electrolyte suction tube having
  - an upper end connected to the venturi valve between the proximal end of the venturi valve and the distal end of the venturi valve, and
  - a lower end near an inner surface of the bottom wall of the battery case, the lower end having an orifice;
- a felt baffle fixedly connected to an inner surface of the upper wall and extending downward toward near the electrolyte solution, the felt baffle facing the distal end of the venturi valve near and opposite the distal end of the venturi valve;
- an air outlet formed through the second sidewall proximate to an upper end of the second sidewall above the surface of the electrolyte solution, the air outlet being exposed to outside of the battery case and having an opening inside the battery case for an outflow of air;
- a floating ball that floats on a surface of the electrolyte solution;
- a water tube having:
  - a water inlet in the first sidewall exposed to an outside of the battery case;
  - a water outlet inside the battery case disposed over the electrolyte solution, the water outlet being an orifice adapted to be closed when said floating ball floats up in response to an increase in an amount of the electrolyte solution inside the battery case;
  - a laterally extending portion extending between a laterally extending portion proximal end connected to the water inlet and a laterally extending portion distal end; and
  - a vertically extending portion having a vertically extending portion proximal end and a vertically extending portion distal end and extending downwardly from the laterally extending portion distal end toward the electrolyte solution,
  - the vertically extending portion proximal end being connected to the laterally extending portion distal end, and
  - the vertically extending portion distal end being connected to the water outlet
- a floating ball house provided at the vertically extending portion distal end and containing the floating ball therein and adapted to allow vertical movements of the floating ball within in response to changes in a surface level of the electrolyte solution in the battery case.

95. An electrical battery as in claim 94 further comprising:
- a first open mesh tube disposed opposite the air inlet having therein a first float tat floats on the surface of the electrolyte solution and a first sealing ball disposed above the first float, the first sealing ball moving in response to the movement of the first float,
- wherein the first sealing ball is arranged in the first open mesh tube such that the opening of the air inlet is sealable by the first sealing ball when the first sealing ball is floated upward in response to a rise in a surface level of the electrolyte solution.

96. An electrical battery as in claim 94, wherein the positive plate elements and the negative plate elements are made of lead foam.

97. An electrical battery as in claim 96 further comprising:
- an air outlet formed through the second sidewall proximate to an upper end of the second sidewall above the surface of the electrolyte solution, the air outlet being exposed to an outside of the battery case and having an opening inside the battery case for an outflow of air; and
- a second open mesh tube disposed opposite the air inlet having therein a second float that floats on the surface of the electrolyte solution and a second sealing ball disposed above the second float, the second sealing ball moving in response to the movement of the second float,
- wherein the second sealing ball is arranged in the second open mesh tube such that the opening of the air outlet is sealable by the second sealing ball when the second sealing ball is floated upward in response to a rise in a surface level of the electrolyte solution.

98. An electrical battery as in claim 96 further comprising: a venturi valve having a proximal end connected to the air inlet and a distal end banging substantially over the electrolyte solution inside the battery case, the distal end of the venturi valve including the opening of the air inlet inside the battery case.

99. An electrical battery as in claim 95 or claim 96 wherein the first float and the first sealing ball are integrally formed.

100. An electrical battery as in claim 96 wherein the second float and the second sealing ball are integrally formed.

* * * * *